(12) United States Patent
Mildh et al.

(10) Patent No.: US 11,432,360 B2
(45) Date of Patent: Aug. 30, 2022

(54) CHANGING GTP TEIP UPON UE RESUME

(71) Applicant: Telefonaktiebolaget LM Ericsson (publ), Stockholm (SE)

(72) Inventors: Gunnar Mildh, Sollentuna (SE); Ioanna Pappa, Stockholm (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 42 days.

(21) Appl. No.: 16/954,602

(22) PCT Filed: Jan. 11, 2019

(86) PCT No.: PCT/SE2019/050015
§ 371 (c)(1),
(2) Date: Jun. 17, 2020

(87) PCT Pub. No.: WO2019/139535
PCT Pub. Date: Jul. 18, 2019

(65) Prior Publication Data
US 2020/0337107 A1    Oct. 22, 2020

Related U.S. Application Data

(60) Provisional application No. 62/616,852, filed on Jan. 12, 2018.

(51) Int. Cl.
*H04W 76/22*    (2018.01)
*H04W 76/12*    (2018.01)
(Continued)

(52) U.S. Cl.
CPC ............ *H04W 76/22* (2018.02); *H04W 8/08* (2013.01); *H04W 40/34* (2013.01); *H04W 76/11* (2018.02); *H04W 76/12* (2018.02); *H04W 76/19* (2018.02)

(58) Field of Classification Search
CPC ..... H04W 76/11; H04W 76/18; H04W 76/19; H04W 76/20; H04W 76/22
See application file for complete search history.

(56) References Cited

U.S. PATENT DOCUMENTS

2017/0265175 A1\*   9/2017   Gandhi ................. H04W 76/20
2020/0323010 A1\*   10/2020  Sivavakeesar ........ H04W 76/11
(Continued)

OTHER PUBLICATIONS

PCT International Search Report issued for International application No. PCT/SE2019/050015—dated Apr. 18, 2019.
(Continued)

*Primary Examiner* — Marcus Smith
(74) *Attorney, Agent, or Firm* — Sage Patent Group

(57) ABSTRACT

According to certain embodiments, a network node is operable to change a general packet radio service (GPRS) tunneling protocol (GTP) tunneling endpoint identifier (TEID) when a user equipment (UE) resumes a connection to a core network. The network node comprises processing circuitry operable to receive a resume request from a UE; determine that the UE was previously connected to the network node prior to the resume; obtain one or more GTP TEIDs that are different than GTP TEIDs that were used when the UE was previously connected to the network node; and transmit an indication of the one or more GTP TEIDs to the core network. Transmitting the indication to the core network may comprise a path switch procedure, a UE context resume procedure, or a radio access bearer modification procedure.

15 Claims, 24 Drawing Sheets

```
1500

┌──────────────────────────────────────────────────────────────────┐
│ 1510 – receive an indication from the core network that the core network │
│        supports changing GTP TEIDs upon connection resume               │
└──────────────────────────────────────────────────────────────────┘
                                 ↓
┌──────────────────────────────────────────────────────────────────┐
│           1512 – receive a resume request from a UE              │
└──────────────────────────────────────────────────────────────────┘
                                 ↓
┌──────────────────────────────────────────────────────────────────┐
│  1514 – determine that the UE was previously connected to the network node │
│                         prior to the resume                      │
└──────────────────────────────────────────────────────────────────┘
                                 ↓
┌──────────────────────────────────────────────────────────────────┐
│  1516 – obtain one or more GTP TEIDs that are different than GTP TEIDs that │
│     were used when the UE was previously connected to the network node    │
└──────────────────────────────────────────────────────────────────┘
                                 ↓
┌──────────────────────────────────────────────────────────────────┐
│  1518 – transmit an indication of the one or more GTP TEIDs to the core │
│                            network                               │
└──────────────────────────────────────────────────────────────────┘
```

(51) Int. Cl.
  *H04W 8/08* (2009.01)
  *H04W 40/34* (2009.01)
  *H04W 76/19* (2018.01)
  *H04W 76/11* (2018.01)

(56) References Cited

U.S. PATENT DOCUMENTS

2020/0351740 A1* 11/2020 Li .................. H04W 36/0033
2020/0383164 A1* 12/2020 Kim ................ H04W 76/19
2021/0235533 A1* 7/2021 Xu ................. H04W 76/19

OTHER PUBLICATIONS

PCT Written Opinion of the International Searching Authority issued for International application No. PCT/SE2019/050015—dated Apr. 18, 2019.
3GPP TS 23.139 v14.0.0; Technical Specification; 3rd Generation Partnership Project; Technical Specification Group Services and System Aspects; 3GPP system—fixed broadband access network interworking; Stage 2 (Release 14)—Mar. 2017.
3GPP TS 23.401 v15.2.0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15)—Dec. 2017.
3GPP TS 23.501 v15.0.0; Technical Specification; 3rd Generation Partnership Project; Technical Specification Group Services and System Aspects; System Architecture for the 5G System; Stage 2 (Release 15)—Dec. 2017.
3GPP TS 29.274 v15.2.0; Technical Specification; 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15)—Dec. 2017.
3GPP TS 36.300 v15.0.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)—Dec. 2017.
3GPP TS 36.413 v15.0.0; Technical Specification; 3rd Generation Partnership Project; Technical Specification Group Radio Access Network; Evolved Universal Terrestrial Radio Access Network (E-Utran); S1 Application Protocol (S1AP) (Release 15)—Dec. 2017.
3GPP TS 37.340 v15.0.0; Technical Specification; 3rd Generation Partnership Project; Technical Specification Group Radio Access Network; Evolved Universal Terrestrial Radio Access (E-UTRA) and NR; Multi-connectivity; Stage 2 (Release 15)—Dec. 2017.
3GPP TS 38.300 v.0.6.0; Technical Specification; 3rd Generation Partnership Project; Technical Specification Group Radio Access Network; NR; NR and NG-RAN Overall Description; Stage 2 (Release 15)—Aug. 2017.
3GPP TS 38.401 v0.4.1; Technical Specification; 3rd Generation Partnership Project; Technical Specification Group Radio Access Network; NG-RAN; Architecture description (Release 15)—Oct. 2017.
3GPP TS 33.401 v15.1.0; Technical Specification; 3rd Generation Partnership Project; Technical Specification Group Services and System Aspects; 3GPP System Architecture Evolution (SAE); Security architecture (Release 15)—Sep. 2017.
3GPP TSG-RAN WG2 Meeting #95; Gothenburg, Sweden; Change Request; Title: Corrections to C-IoT optimisations in Stage-2; Source to WG: Ericsson; Source to TSG: R2 (R2-165844)—Aug. 22-26, 2016.

* cited by examiner

CHANGING GTP TEIP UPON UE RESUME

PRIORITY

This nonprovisional application is a U.S. National Stage Filing under 35 U.S.C. § 371 of International Patent Application Serial No. PCT/SE2019/050015 filed Jan. 11, 2019 and entitled "CHANGING GTP TEID UPON UE RESUME" which claims priority to U.S. Provisional Patent Application No. 62/616,852 filed Jan. 12, 2018 both of which are hereby incorporated by reference in their entirety.

TECHNICAL FIELD

Embodiments of the present disclosure are directed to wireless communications and, more particularly, to changing a general packet radio service (GPRS) tunneling protocol (GTP) tunneling endpoint identifier (TEID) when a user equipment (UE) resumes a connection to the core network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Evolved packet system (EPS) is the evolved Third Generation Partnership Project (3GPP) packet switched domain and consists of evolved packet core (EPC) and evolved universal terrestrial radio access network (E-UTRAN).

FIG. 1 is a block diagram illustrating an overview of the EPC architecture. The architecture is defined in 3GPP TS 23.401, which includes definitions of the packet data network (PDN) gateway (PGW), serving gateway (SGW), policy and charging rules function (PCRF), mobility management entity (MME) and mobile device (e.g., user equipment (UE)). The long term evolution (LTE) radio access, E-UTRAN, consists of one more eNBs.

FIG. 2 is a block diagram illustrating an example E-UTRAN architecture. The architecture is defined in 3GPP TS 36.300. The E-UTRAN includes eNBs that provide the E-UTRA user plane (e.g., packet data convergence protocol (PDCP), radio link control (RLC), media access control (MAC), and physical layer (PHY)) and control plane (e.g., radio resource control (RRC)) protocol terminations towards the UE. The X2 interface interconnects the eNBs with each other. The S1 interface connects the eNBs to the EPC, more specifically to the MME by the S1-MME interface and to the SGW by the S1-U interface.

The main parts of the EPC control plane (CP) and user plane (UP) architectures are illustrated in FIGS. 3 and 4. FIG. 3 is a block diagram illustrating an example EPC control plane architecture. FIG. 4 is a block diagram illustrating an example EPC user plane architecture.

FIG. 5 is a block diagram illustrating an example fifth generation (5G) radio access network (RAN) architecture. The architecture is described in 3GPP TS38.401. The next generation (NG) RAN includes a set of gNBs connected to the 5G core (5GC) through the NG interface. A gNB can support frequency division duplex (FDD) mode, time division duplex (TDD) mode, or dual mode operation. Multiple gNBs can be interconnected through the Xn interface. A gNB may include a gNB central unit (gNB-CU) and gNB distributed units (gNB-DUs). A gNB-CU and a gNB-DU are connected via F1 logical interface. One gNB-DU is connected to only one gNB-CU. For resiliency, a gNB-DU may be connected to multiple gNB-CU by appropriate implementation.

NG, Xn and F1 are logical interfaces. The NG-RAN is layered into a radio network layer (RNL) and a transport network layer (TNL). The NG-RAN architecture (i.e., the NG-RAN logical nodes and interfaces between them) is defined as part of the RNL. For each NG-RAN interface (e.g., NG, Xn, F1) the related TNL protocol and the functionality are specified. The TNL provides services for user plane transport and signalling transport.

In NG-Flex configuration, each gNB is connected to all 5GC nodes within a pool area. The pool area is defined in 3GPP TS 23.501. If security protection for control plane and user plane data on TNL of NG-RAN interfaces needs to be supported, NDS/IP (3GPP TS 33.401) may be applied.

3GPP 5G also supports dual connectivity (DC). DC operation includes establishing master and secondary nodes and distributing user plane (UP) traffic to the master node (MN) and secondary nodes (SNs) to optimize traffic and radio resource management. Control plane (CP) traffic is assumed to terminate in one node only (i.e., the MN). FIGS. 6 and 7 illustrate the protocol and interfaces involved in dual connectivity, as per TS38.300v0.6.

FIG. 6 is a block diagram illustrating MgNB bearers for dual connectivity. A master gNB (MgNB) forwards PDCP bearer traffic to a secondary gNB (SgNB).

FIG. 7 is a block diagram illustrating SgNB bearers for dual connectivity. A SgNB forwards PDCP bearer traffic to the MgNB. The MgNB and SgNB may be subject to the RAN split architecture outlined above and comprising CUs and DUs.

Furthermore, 5G standardization may include multiple radio access technology (multi-RAT) dual connectivity (MR-DC). For MR-DC, a RAN node (the master node, MN) anchors the control plane towards the core network, while another RAN node (the secondary node, SN) provides control and user plane resources to the UE via coordination with the MN. An example is illustrated in FIG. 8 (reproduced from TS 37.340).

FIG. 8 is a block diagram illustrating principles of MR-DC in 5G. Within the scope of MR-DC, various user plane/bearer type solutions are possible, as illustrated in FIG. 9 (reproduced from TS 37.340).

FIG. 9 is a block diagram illustrating radio protocol architecture for MCG, MCG Split, SCG, and SCG Split bearers in MR-DC with 5GC. 3GPP TS 38.401 describes procedures such as signalling flows in gNB-CU/gNB-DU architecture (e.g., initial access from the UE, inter-DU mobility, etc.).

A particular version of MR-DC is referred to as EN-DC where the LTE eNB is the Master Node (MN) and the NR gNB is the secondary node (SN).

LTE Release 13 includes radio resource control (RRC) suspend/resume functionality. A suspended UE may be considered to be in an intermediate state between IDLE and CONNECTED, where the UE AS context is kept both at the UE and RAN, and the UE may be regarded as if it is in connected mode by the core network and in IDLE mode by the RAN. An advantage of operating in this mode is reduced signalling towards the core network and faster transition to CONNECTED mode as compared to legacy IDLE-CONNECTED mode transitions, while maintaining the UE power saving advantages of IDLE mode. Both LTE Release 15 and NR may support enhanced version of the suspend/resume functionality (known as lightly connected UE in LTE and inactive mode in NR).

In LTE, when the network decides to move the UE to inactive state, the eNB sends the UE an RRCConnectionRelease message with the release cause value of rrc-suspend and provides a Resume ID. During its suspend procedure, the UE stores the resumeIdentity and UE AS context (including the current RRC configuration, the current security context, the PDCP state including ROHC state, C-RNTI used in the source PCell, the cellIdentity and the physical cell identity of the source PCell) and suspends all DRBs and SRBs except SRB0. During its resume procedure, the UE re-establishes all RLC entities (both for SRBs and DRBs). The RRC connection suspend procedure is illustrated in FIG. 10.

FIG. 10 is a flow diagram illustrating an example RRC connection suspend procedure. At step 1, an eNB decides to suspend an RRC connection based on a trigger (e.g., the expiry of a UE inactivity timer). The eNB, at step 2, initiates the S1-AP UE Context Suspend procedure to inform the MME that the RRC connection is being suspended. At step 3, the MME requests the S-GW to release all S1-U bearers for the UE. The MME Acknowledges step 2 at step 4. At step 5, the eNB suspends the RRC connection by sending an RRCConnectionRelease message with the releaseCause set to rrc-Suspend. The message includes the resumeIdentity which is stored by the UE. At step 6, the UE stores the AS context, suspends all SRBs and DRBs, and enters RRC_IDLE light connected state.

When the UE later on wants to resume the connection (e.g., in response to uplink data to be sent or a paging request for downlink data), the UE sends an RRCConnectionResumeRequest message with the saved resumeIdentity. The eNB responds with an RRCConnectionResume message, and both the UE and eNB restore the saved UE context, and data transmission/reception from/to the UE can be resumed.

The resume operation can be performed in an eNB other than the eNB that was serving the UE when the UE was suspended. In that case, the new eNB can perform a context fetch, for example, by using the Retrieve UE Context procedure from the old eNB (because the resumeIdentity includes information about the old eNB/cell). The RRC connection resume procedure in the same eNB and new eNB are illustrated in FIGS. 11 and 12, respectively.

FIG. 11 is a flow diagram illustrating an RRC Connection Resume procedure where the suspend and resume occur at the same eNB. Step 1 occurs at some time after the RRC connection suspend procedure, such as when the UE is being paged or when new data arrives in the uplink buffer, and the UE resumes the connection by sending an RRCConnectionResumeRequest to an eNB. The UE includes its Resume ID, the establishment cause, and authentication token. The authentication token is calculated in the same way as the short MAC-I used in RRC connection re-establishment and allows the eNB to verify the UE identity.

At step 2, provided that the Resume ID exists and the authentication token is successfully validated, the eNB responds with an RRCConnectionResume. The message includes the Next Hop Chaining Count (NCC) value which is used to re-establish the AS security.

At step 3, the UE resumes all SRBs and DRBs and re-establishes the AS security. The UE is now in RRC_CONNECTED state.

At step 4, the UE responds with an RRCConnectionResumeComplete confirming that the RRC connection was resumed successfully. The eNB, at step 5, initiates the S1-AP Context Resume procedure to notify the MME about the UE state change. The MME requests the S-GW to activate the S1-U bearers for the UE at step 6. The MME acknowledges step 5 at step 7.

FIG. 12 is a flow diagram illustrating an RRC Connection Resume procedure where the suspend and resume occur at different eNBs. Step 1 is the same as in FIG. 11, where the UE resumes the connection by sending an RRCConnectionResumeRequest to an eNB. At step 2, the new eNB locates the old eNB using the Resume ID and retrieves the UE context by the X2-AP Retrieve UE Context procedure. At step 3, the old eNB responds with the UE context associated with the Resume ID.

Steps 4-6 are the same as steps 2-4 in FIG. 11, respectively. At step 7, the new eNB initiates the S1-AP Path Switch procedure to establish a S1 UE associated signalling connection to the serving MME and to request the MME to resume the UE context.

At step 8, the MME requests the S-GW to activate the S1-U bearers for the UE and updates the downlink path. The MME acknowledges step 7 at step 9.

At step 10, after the S1-AP Path Switch procedure, the new eNB triggers release of the UE context at the old eNB by means of the X2-AP UE Context Release procedure.

SUMMARY

Based on the description above, there currently exist certain challenges for changing a general packet radio service (GPRS) tunneling protocol (GTP) tunneling endpoint identifier (TEID) when a user equipment (UE) resumes a connection to the core network. For example, when a UE resumes a connection in the same (M)eNB, the (M)eNB may determine that it cannot use the same GTP TEIDs that it used prior to the resume. Some possible reasons for not being able to use the same GTP TEIDs include the following: (a) the UE was in EN-DC prior to the suspend and the bearers (tunnels) under question were configured in SgNB prior to suspend, but at resume the (M)eNB may determine not to use a SgNB at all or use a different SgNB; (b) the bearers were configured in MeNB prior to suspend (or removed from the SgNB at suspend), but at resume the MeNB may determine to move the bearers to a SgNB to support a smooth transition to EN-DC; or (c) any other reason (e.g., resource load balancing) why it is not possible to allocate the same GTP TEIDs to the UE when UE resumes.

Currently there is no way for the (M)eNB to change the GTP TEIDs when using the S1-AP UE Context Resume Request. Thus, it is not possible for the (M)eNB to change the GTP TEIDs at resume.

Certain aspects of the present disclosure and their embodiments may provide solutions to these or other challenges. Particular embodiments facilitate the (M)eNB changing the GTP TEIDs at resume when the UE resumes at the same node. The MeNB can handle cases where bearers were configured in SgNB prior to suspend, but at resume MeNB may determine to move them, or vice versa when bearers configured in SgNB prior to suspend, but at resume are moved to MeNB. Particular embodiments may include path switch, S1-resume enhancement, and/or E-RAB modification indication procedure.

According to some embodiments, a method for use in a network node for changing a GTP TEID when a UE resumes a connection to a core network comprises: receiving a resume request from a UE; determining that the UE was previously connected to the network node prior to the resume; obtaining one or more GTP TEIDs that are different than GTP TEIDs that were used when the UE was previously connected to the network node; and transmitting an indication of the one or more GTP TEIDs to the core network.

In particular embodiments, transmitting the indication of the one or more GTP TEIDs to the core network comprises initiating a path switch procedure (e.g., LTE S1 Path Switch, NR NG Path Switch, etc.) with the core network. The path switch procedure comprises transmitting path switch request message that includes the one or more GTP TEIDs.

In particular embodiments, transmitting the indication of the one or more GTP TEIDs to the core network comprises initiating a UE context resume procedure (e.g., LTE S1 Context Resume, NR NG Context Resume, etc.) with the core network. The UE context resume procedure comprises transmitting a UE context resume message that includes the one or more GTP TEIDs.

In particular embodiments, transmitting the indication of the one or more GTP TEIDs to the core network comprises initiating a radio access bearer modification procedure (e.g., LTE procedure or equivalent NR procedure) with the core network. The radio access bearer modification procedure comprises transmitting a radio access bearer modification message that includes the one or more GTP TEIDs. The radio access bearer modification message may further include an indication that a radio bearer associated with one of the one or more GTP TEIDs is to be resumed.

In particular embodiments, the resume request includes an identifier, and determining that the UE was previously connected to the network node prior to the resume is based on the identifier in the resume request.

In particular embodiments, obtaining the one or more GTP TEIDs comprises receiving the one or more GTP TEIDs from another network node.

In particular embodiments, the method further comprises receiving an indication from the core network that the core network supports changing GTP TEIDs upon connection resume.

According to some embodiments, a network node is operable to change a GTP TEID when a UE resumes a connection to a core network. The network node comprises processing circuitry operable to: receive a resume request from a UE; determine that the UE was previously connected to the network node prior to the resume; obtain one or more GTP TEIDs that are different than GTP TEIDs that were used when the UE was previously connected to the network node; and transmit an indication of the one or more GTP TEIDs to the core network.

In particular embodiments, the processing circuitry is operable to transmit the indication of the one or more GTP TEIDs to the core network by initiating a path switch procedure (e.g., LTE or NR procedure) with the core network. The path switch procedure comprises transmitting path switch request message that includes the one or more GTP TEIDs.

In particular embodiments, the processing circuitry is operable to transmit the indication of the one or more GTP TEIDs to the core network by initiating a UE context resume procedure (e.g., LTE or NR procedure) with the core network. The UE context resume procedure comprises transmitting a UE context resume message that includes the one or more GTP TEIDs.

In particular embodiments, the processing circuitry is operable to transmit the indication of the one or more GTP TEIDs to the core network by initiating a radio access bearer modification procedure (e.g., LTE or NR procedure) with the core network. The radio access bearer modification procedure comprises transmitting a radio access bearer modification message that includes the one or more GTP TEIDs. The radio access bearer modification message may further include an indication that a radio bearer associated with one of the one or more GTP TEIDs is to be resumed.

In particular embodiments, the resume request includes an identifier, and the processing circuitry is operable to determine that the UE was previously connected to the network node prior to the resume based on the identifier in the resume request.

In particular embodiments, the processing circuitry is operable to obtain the one or more GTP TEIDs by receiving the one or more GTP TEIDs from another network node.

In particular embodiments, the processing circuitry is further operable to receive an indication from the core network that the core network supports changing GTP TEIDs upon connection resume.

According to some embodiments, a network node is operable to change a GTP TEID when a UE resumes a connection to a core network. The network node comprises a receiving module, a determining module, and a transmitting module. The receiving module is operable to receive a resume request from a UE. The determining module is operable to determine that the UE was previously connected to the network node prior to the resume and obtain one or more GTP TEIDs that are different than GTP TEIDs that were used when the UE was previously connected to the network node. The transmitting module is operable to transmit an indication of the one or more GTP TEIDs to the core network.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. Particular embodiments facilitate the MeNB handling cases where bearers were configured in SgNB prior to suspend, but at resume MeNB may determine to move them, or vice versa when bearers configured in SgNB prior to suspend, but at resume are moved to MeNB. A particular advantage is that the MeNB does not need to remove SgNB prior to the suspend, which would cause additional signaling (e.g., between MeNB and SgNB, and between MeNB and the core network (MME)). The MeNB can, if needed, remove the SgNB when the UE resumes.

Another advantage is that the MeNB or SgNB may allocate different GTP TEIDs when the UE resumes. Because GTP TEIDs are typically used for internal routing within nodes, this enables the MeNB and SgNB to load balance their internal processing units or virtual machines (e.g., re-assign the UE context to a different unit).

Particular embodiments enable the MeNB to select a different SgNB when the UE resumes, which may be more suitable to serve the UE (e.g., have better radio connection to the UE leading to improved end user performance, lower power consumption, etc.).

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
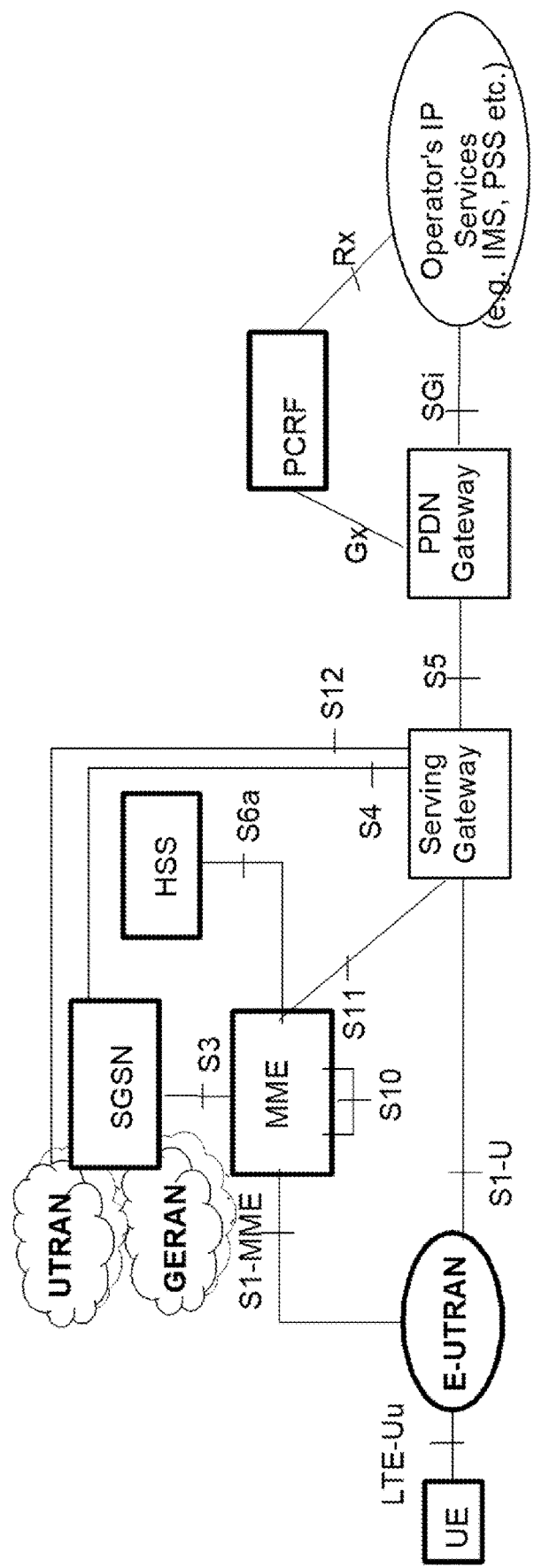
FIG. 1 is a block diagram illustrating an example evolved packet core (EPC) architecture.
Figure 2:
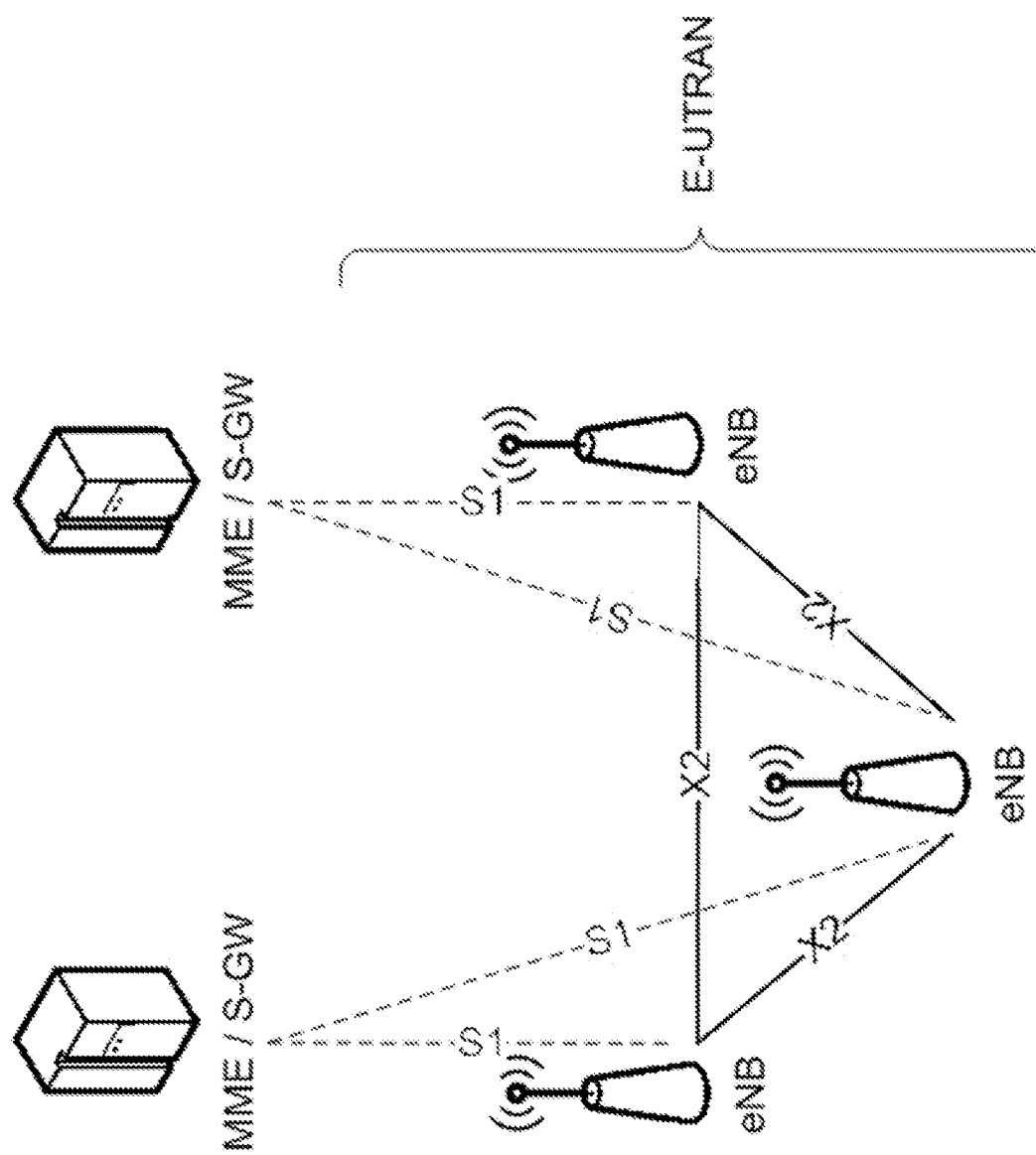
FIG. 2 is a block diagram illustrating an example evolved universal terrestrial radio access network (E-UTRAN) architecture.
Figure 3:
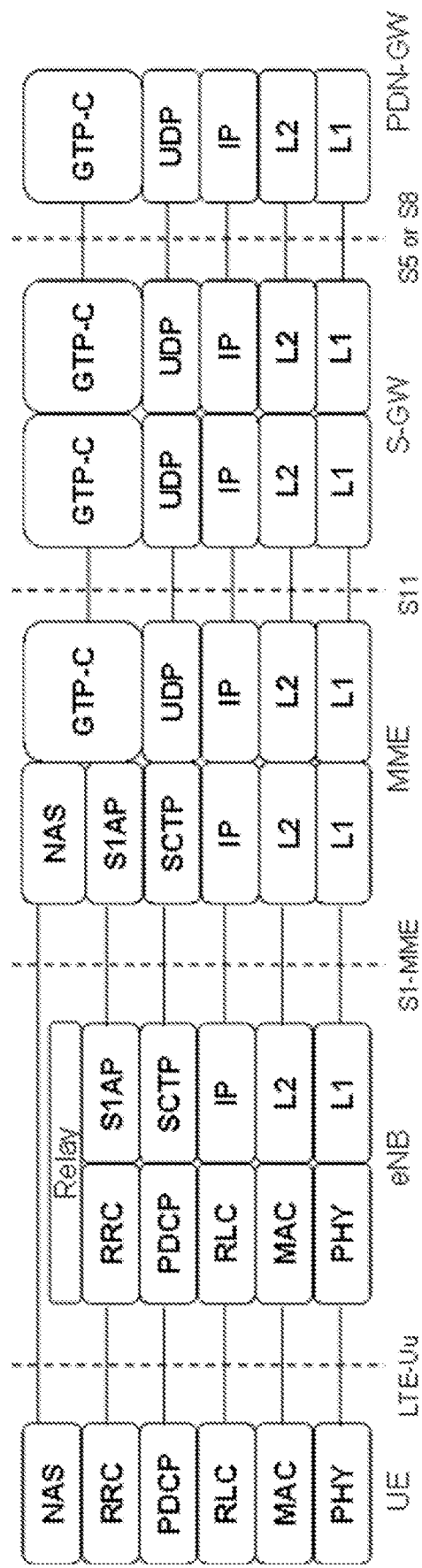
FIG. 3 is a block diagram illustrating an example EPC control plane architecture.
Figure 4:
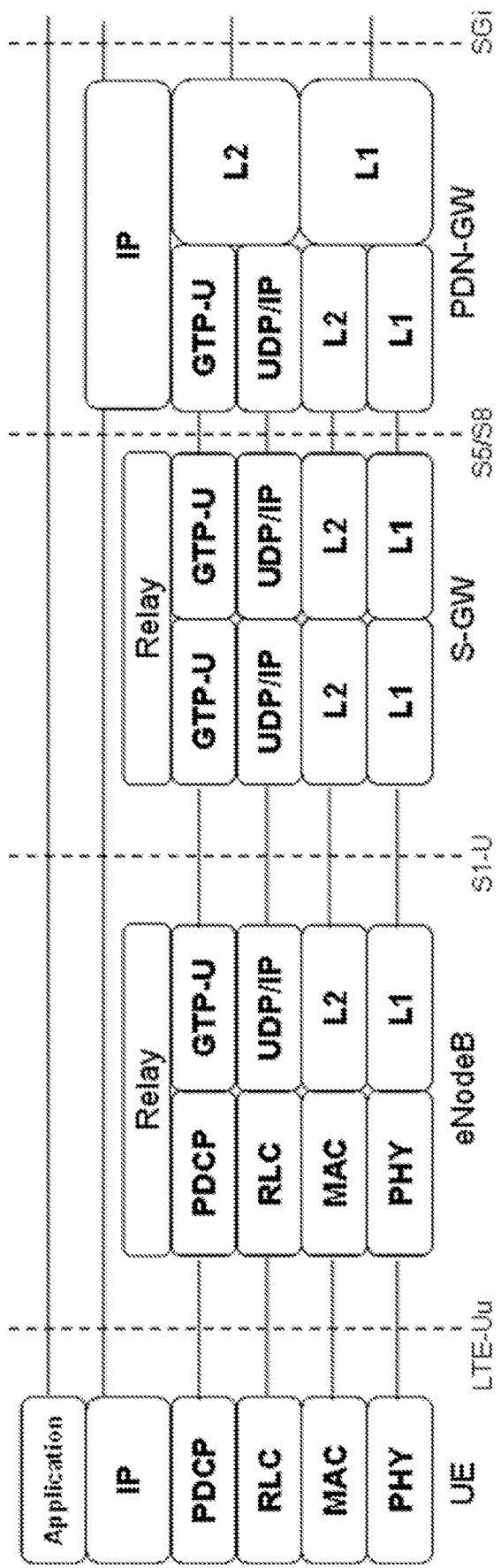
FIG. 4 is a block diagram illustrating an example EPC user plane architecture.
Figure 5:
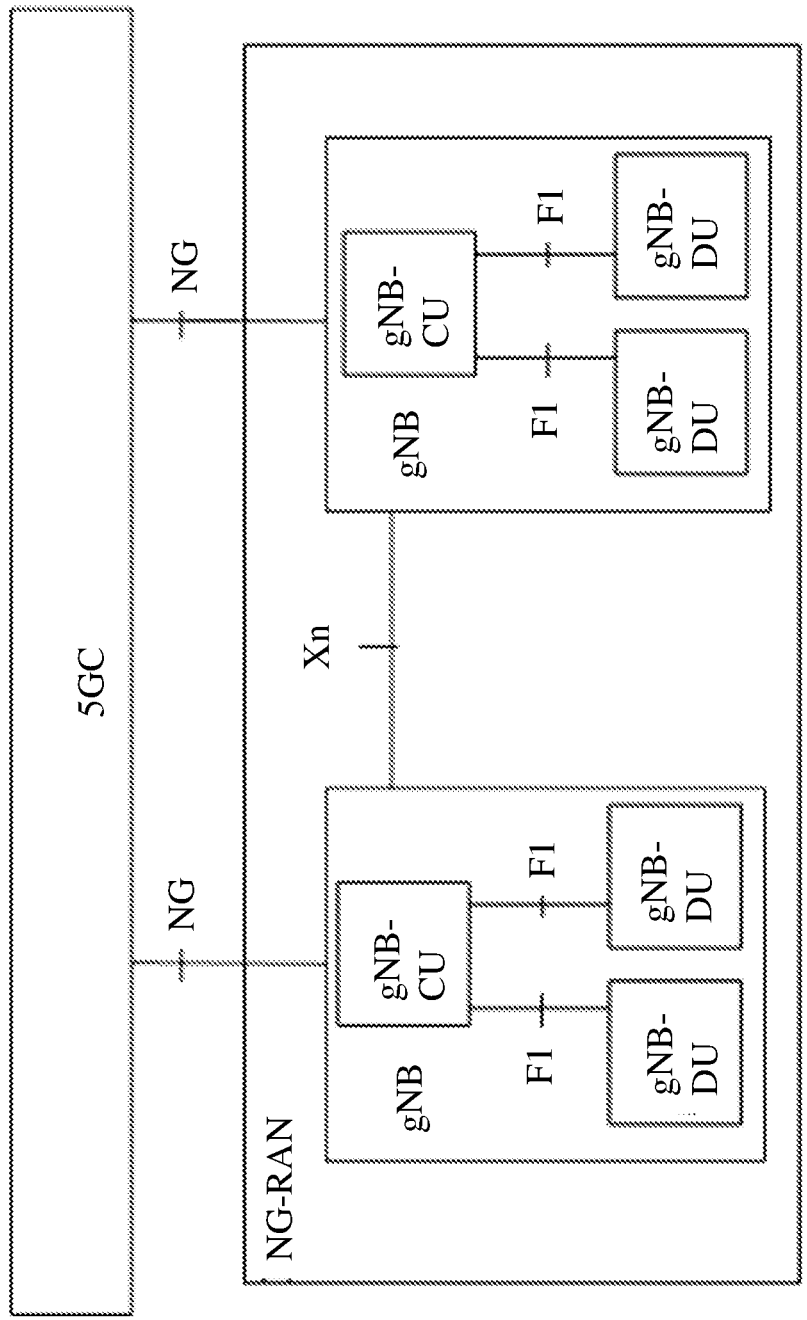
FIG. 5 is a block diagram illustrating an example fifth generation (5G) radio access network (RAN) architecture.
Figure 6:
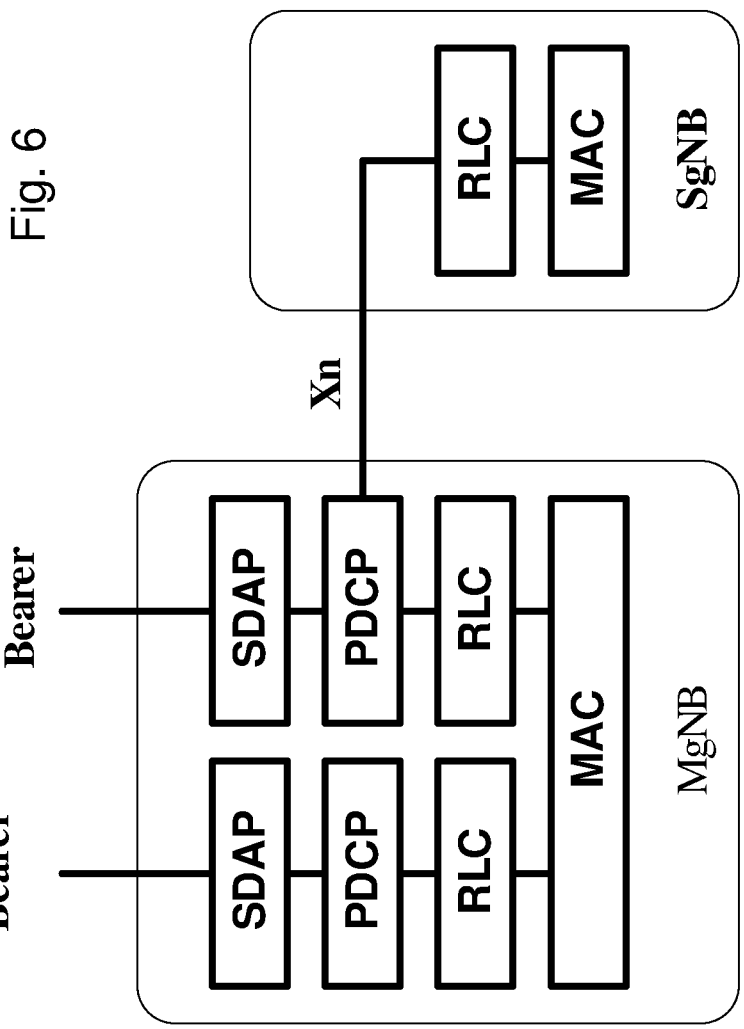
FIG. 6 is a block diagram illustrating MgNB bearers for dual connectivity.
Figure 7:
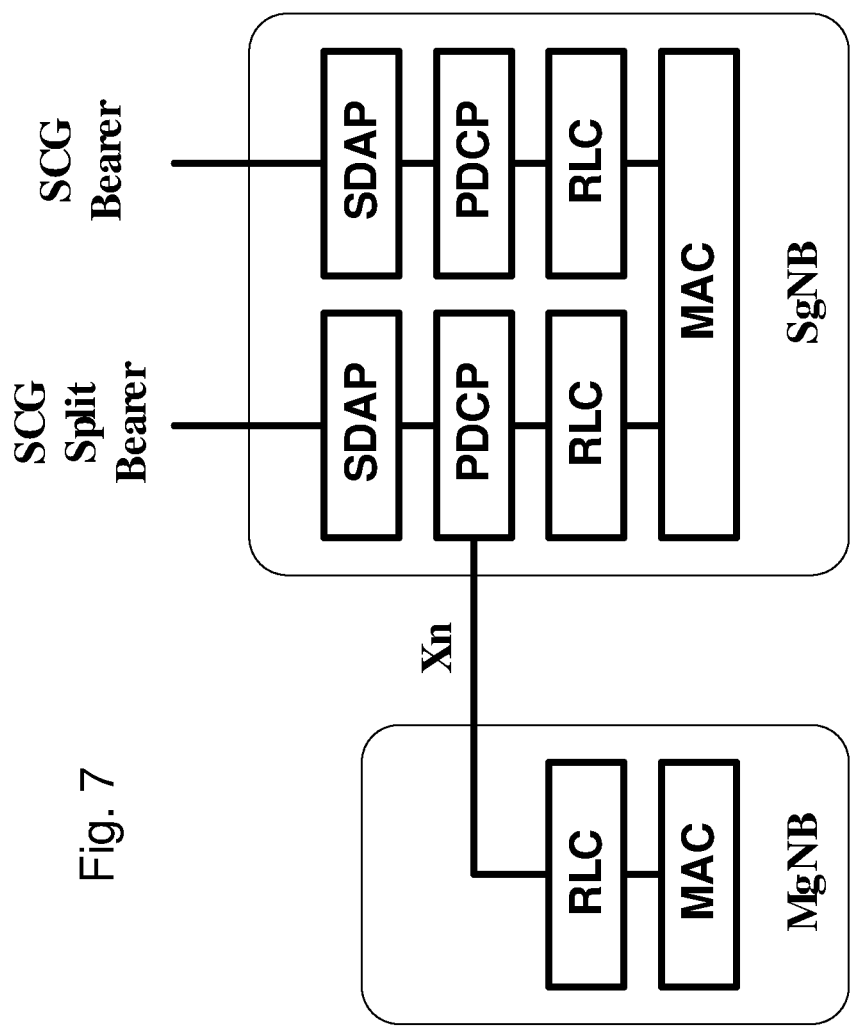
FIG. 7 is a block diagram illustrating SgNB bearers for dual connectivity.
Figure 8:
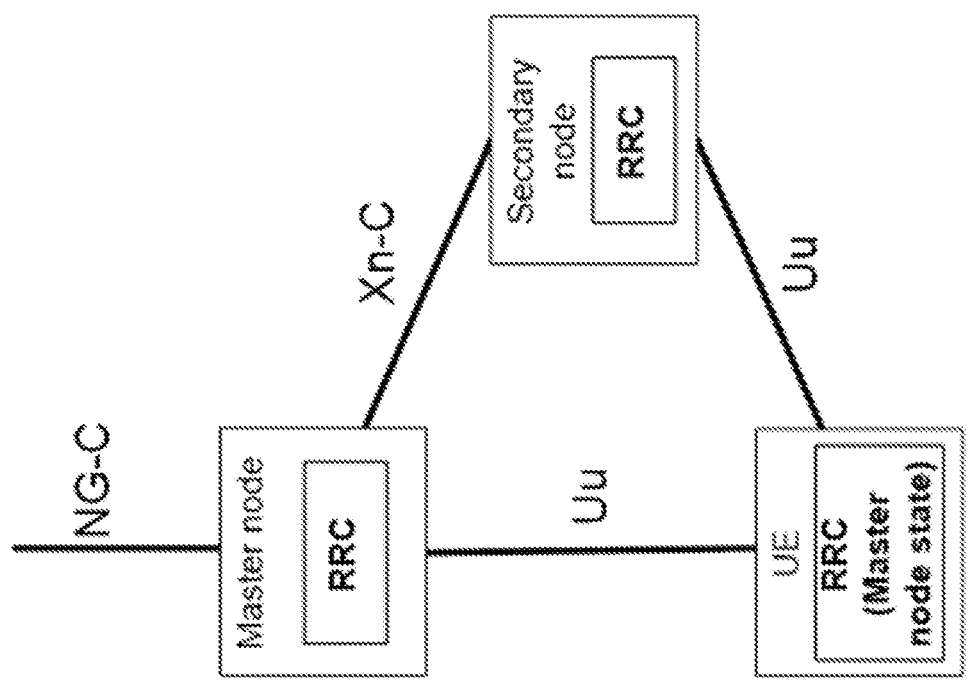
FIG. 8 is a block diagram illustrating principles of multiple radio access technology (multi-RAT) dual connectivity (MR-DC) in 5G.
Figure 9:
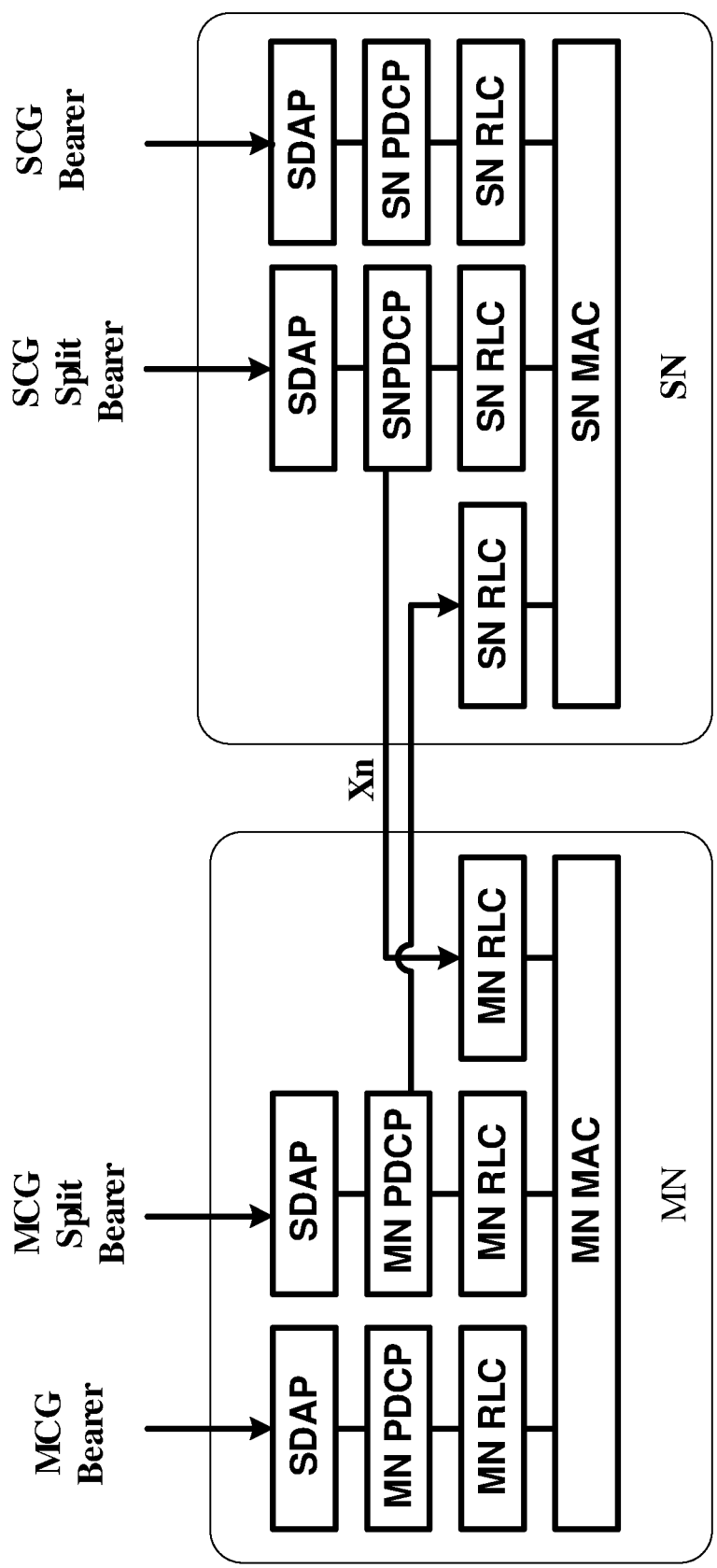
FIG. 9 is a block diagram illustrating radio protocol architecture for MCG, MCG Split, SCG, and SCG Split bearers in MR-DC with 5GC.
Figure 10:
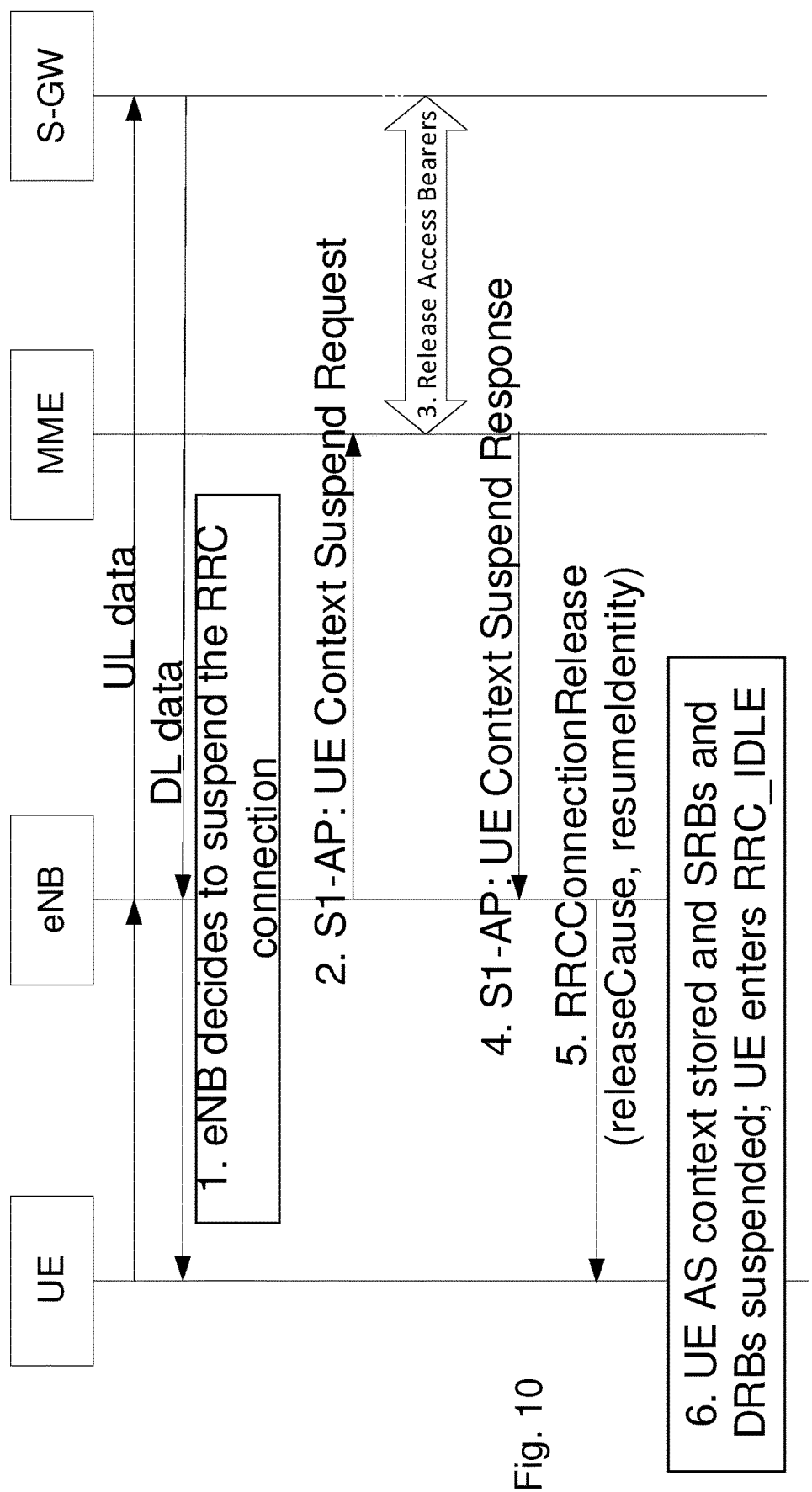
FIG. 10 is a flow diagram illustrating an example RRC connection suspend.
Figure 11:
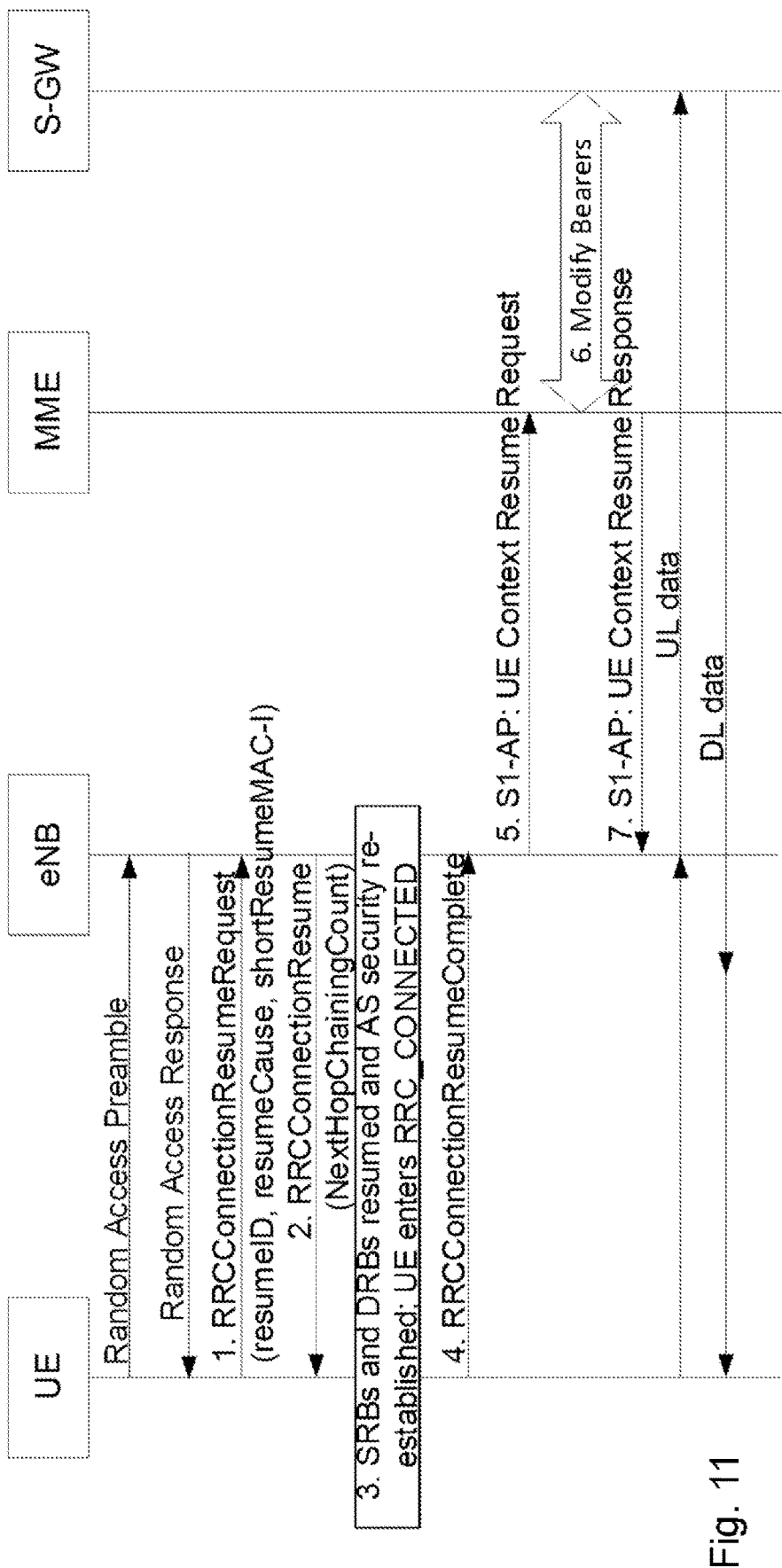
FIG. 11 is a flow diagram illustrating an RRC Connection Resume procedure where the suspend and resume occur at the same eNB.
Figure 12:
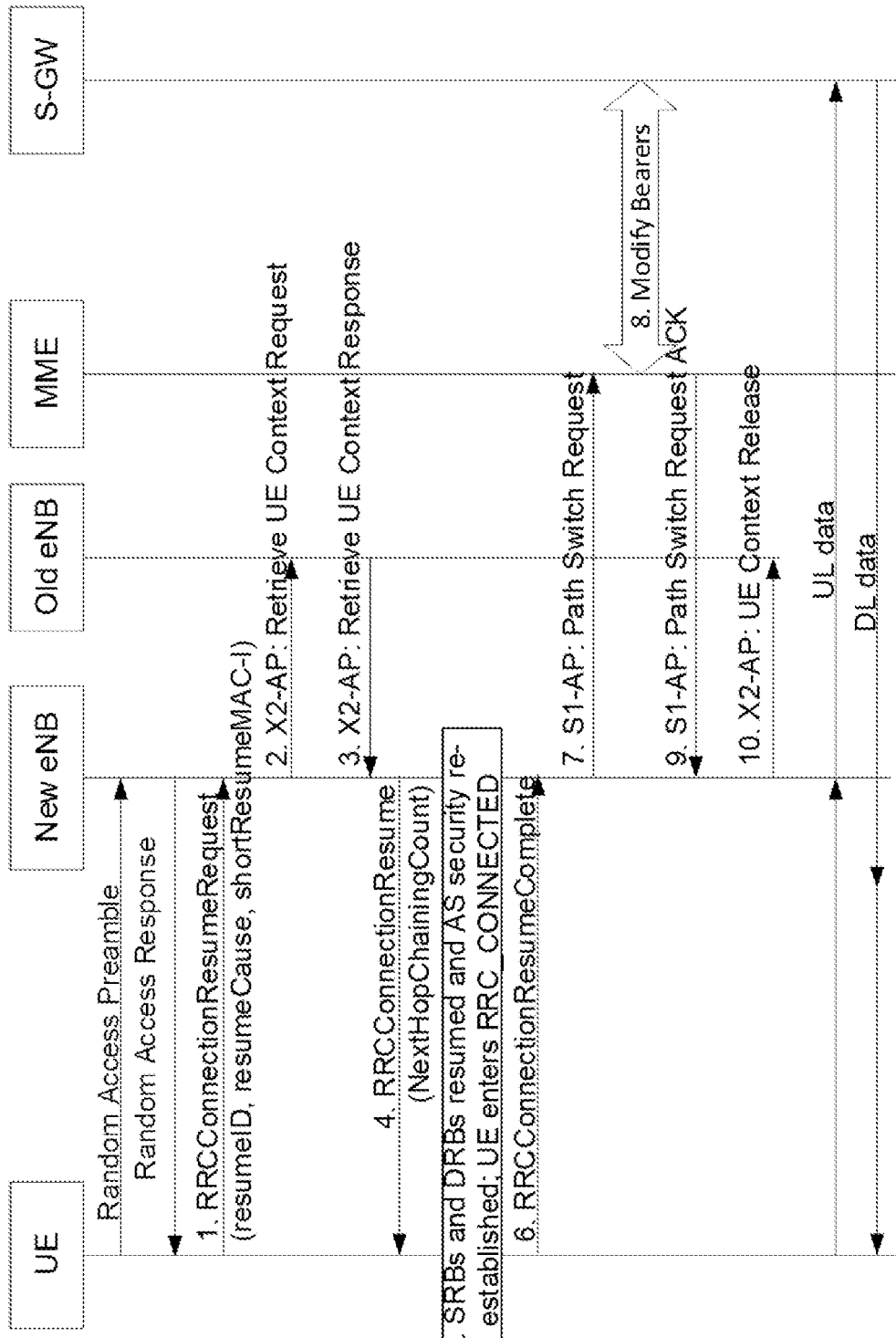
FIG. 12 is a flow diagram illustrating an RRC Connection Resume procedure where the suspend and resume occur at different eNBs.

Based on the description above, there currently exist certain challenges for changing a general packet radio service (GPRS) tunneling protocol (GTP) tunneling endpoint identifier (TEID) when a user equipment (UE) resumes a connection, such as a radio resource control (RRC) connection, to the core network. For example, when a UE resumes a connection in the same (M)eNB, the (M)eNB may determine that it cannot use the same GTP TEIDs that it used prior to the resume. Some possible reasons for not being able to use the same GTP TEIDs include the following: (a) the UE was in EN-DC prior to the suspend and the bearers (tunnels) under question were configured in SgNB prior to suspend, but at resume the (M)eNB may determine not to use a SgNB at all or use a different SgNB; (b) the bearers were configured in MeNB prior to suspend (or removed from the SgNB at suspend), but at resume the MeNB may determine to move the bearers to a SgNB to support a smooth transition to EN-DC; or (c) any other reason (e.g., resource load balancing) why it is not possible to allocate the same GTP TEIDs to the UE when UE resumes.

Currently there is no way for the (M)eNB to change the GTP TEIDs when using the S1-AP UE Context Resume Request. Thus, it is not possible for the (M)eNB to change the GTP TEIDs at resume.

Certain aspects of the present disclosure and their embodiments may provide solutions to these or other challenges. Particular embodiments facilitate the (M)eNB changing the GTP TEIDs at resume when the UE resumes at the same node. The MeNB can handle cases where bearers were configured in SgNB prior to suspend, but at resume MeNB may determine to move them, or vice versa when bearers configured in SgNB prior to suspend, but at resume are moved to MeNB. Particular embodiments may include path switch, S1-resume enhancement, and/or E-RAB modification indication procedure.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The description below refers to a UE in EN-DC, although particular embodiments may also apply to load balancing between different processing units within the same eNB (e.g., when not using EN-DC). Particular embodiments may also apply to other MR-DC cases.

In EN-DC, a UE is served by an MeNB and an SgNB. At some point in time the UE may move to RRC_IDLE state (with suspended RAN context) by a suspend procedure. During the suspend procedure, the MeNB may determine if any of the secondary node terminated bearers should be kept or removed. As far as the context in the SgNB is concerned, the MeNB may require that the UE context is kept in SgNB-CU, but the UE context in SgNB-DU may be removed because it consumes resources and may trigger secondary cell group (SCG) failure on the network side.

When the UE is in RRC_IDLE suspend, the UE may be triggered to resume the RRC connection. Triggers may include receiving a paging message from the network, the arrival of uplink data, or signalling. Moreover, when the UE resumes, it may either return to the same MeNB or to a different eNB.

When the UE returns to a different eNB, the new eNB after successfully fetching the UE context, initiates a path switch procedure towards the core network (CN) which moves the GTP tunnels and S1 connection to the new target eNB. When the UE returns to the same MeNB, and the MeNB determines that it will not be able to use the same GTP TEIDs (on S1 interface) that the MeNB used prior to the resume, the MeNB initiates a procedure to change the GTP TEIDs. Particular procedures are described with respect to the following embodiments.

The procedure above includes LTE Suspend/Resume, but particular embodiments are also applicable when the RRC_INACTIVE state is used (specified in 3GPP Rel-15 for NR and for LTE connected to 5GC). The UE is suspended to RRC_INACTIVE state, and when the UE resumes in the same eNB or gNB, the GTP TEIDs used on the NG interface between NG RAN and 5GC may change. The embodiments described herein provide various ways to achieve this.

In a first group of embodiments, path switch is used to change the GTP TEIDs at resume even when the UE returns to the same node. The current S1 Path Switch procedure is enhanced so that it triggers the Path Switch procedure to resume the connection even when returning to the same node (because the Path switch procedure allows changing the TEIDs). In this case, the MME receives a path switch from the node that was previously serving the UE. The Path Switch Request message from the eNB to MME contains new GTP TEIDs for one or more S1 Radio Access Bearer (RAB). The MME will update the Serving GW (S-GW) to update the downlink GTP TEIDs for those RABs.

An example procedure includes the following steps.
1. An eNB receives a resume request from a UE.
2. The eNB determines, based on the UE Resume ID, that the UE was connected to the same eNB before the resume.
3. The eNB determines which node or function should terminate the user plane for the UE. If the node or function is different from the node or function that was previously serving the UE, the eNB or the node or function may allocate different downlink GTP TEIDs than was previous used. If the node allocating the GTP TEIDs is different from the eNB, the node sends the GTP TEIDs to the eNB (e.g., via X2/Xn or E1 interface).
4. The eNB initiates a Path Switch procedure towards the core network and includes the newly allocated GTP TEIDs in this message.

A second group of embodiments uses an enhanced S1-UE Context Resume procedure. The S1-UE Context Resume is enhanced by including GTP TEIDs triggering the MME to update the S-GW path switch. The GTP TEIDs can be included in the UE CONTEXT RESUME REQUEST message as shown in Table 1 below. The (M)eNB may change the GTP TEIDs of the specified E-RABs.

The UE CONTEXT RESUME REQUEST message is sent by the eNB to the MME to request the MME to indicate that the suspended RRC connection has been resumed.

TABLE 1

| | | | | | | |
|---|---|---|---|---|---|---|
| IE/Group Name | Presence | Range | IE type and reference | Semantics description | Criticality | Assigned Criticality |
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| E-RAB Failed To Resume List | | 0..1 | | | YES | reject |
| >E-RAB Failed To Resume Item IEs | | 1 .. <maxnoofE-RABs> | | | EACH | reject |
| >>E-RAB ID | M | | 9.2.1.2 | | — | |
| >>Cause | M | | 9.2.1.3 | | — | |
| RRC Resume Cause | O | | RRC Establishment Cause 9.2.1.3a | | YES | ignore |
| E-RAB To Be Switched in Downlink List | | 1 | | | YES | reject |
| >E-RABs Downlink Item IEs | Switched in | 1 .. <maxnoofE-RABs> | | | EACH | reject |
| >>E-RAB ID | M | | 9.2.1.2 | | — | |
| >>Transport Layer address | M | | 9.2.2.1 | | — | |
| >>GTP-TEID | M | | 9.2.2.2 | To deliver DL PDUs. | — | |

| Range bound | Explanation |
|---|---|
| maxnoofE-RABs | Maximum no. of E-RAB allowed towards one UE, the maximum value is 256. |

An example procedure includes the following steps.
1. An eNB receives a resume request from the UE.
2. The eNB determines, based on the UE Resume ID, that the UE was connected to the same eNB before the resume.
3. The eNB determines which node or function should terminate the user plane for the UE. If the node or function is different from the node or function that was previously serving the UE, the eNB or the node or function may allocate different downlink GTP TEIDs than was previous used. If the node allocating the GTP TEIDs is different from the eNB, the node sends the GTP TEIDs to the eNB (e.g., via X2/Xn or E1 interface).

4. The eNB initiates the S1-UE Context Resume procedure towards the core network and includes the newly allocated GTP TEIDs in the message.

5. When the MME receives the message, it resumes the UE connection and sends a message to the S-GW to update the downlink GTP TEIDs.

A third group of embodiments enhances the E-RAB modification indication procedure to resume the connection. The current functionality of the S1 E-RAB modification procedure is to change downlink GTP TEIDs, but currently it is not used to resume the UE context. Particular embodiments enhance the procedure to add this functionality.

Particular embodiments include a flag in the E-RAB Modification Indication. If the flag UE resume is on, then the MME will resume the connection and the GTP TEIDs of the indicated E-RABs are changed accordingly.

Other embodiments do not define a flag but instead specify that the MME should always resume the connection if it receives an E-RAB modification indication modification message.

In particular embodiments, the MME may be a legacy MME that does not support this feature. In this case particular embodiments enhance the S1 setup signalling between eNB and MME to include an indication from MME to eNB if it supports this new feature meaning the eNB could use it. Such indication can also be considered for the first and second groups of embodiments described above.

Example procedure may include the following steps.

1. An eNB receives a resume request from a UE.

2. The eNB determines, based on the UE Resume ID, that the UE was connected to the same eNB before the resume.

3. The eNB determines which node or function should terminate the user plane for the UE. If the node or function is different from the node or function that was previously serving the UE, the eNB or the node or function may allocate different downlink GTP TEIDs than was previous used. If the node allocating the GTP TEIDs is different from the eNB, the node sends the GTP TEIDs to the eNB (e.g., via X2/Xn or E1 interface).

4. The eNB initiates the S1 E-RAB modification procedure towards the core network and includes the newly allocated GTP TEIDs in the message and possibly an indication or flag indicating that the UE context should be resumed.

5. When the MME receives the message, it resumes the UE connection and sends a message to the S-GW to update the downlink GTP TEIDs.

Figure 13:
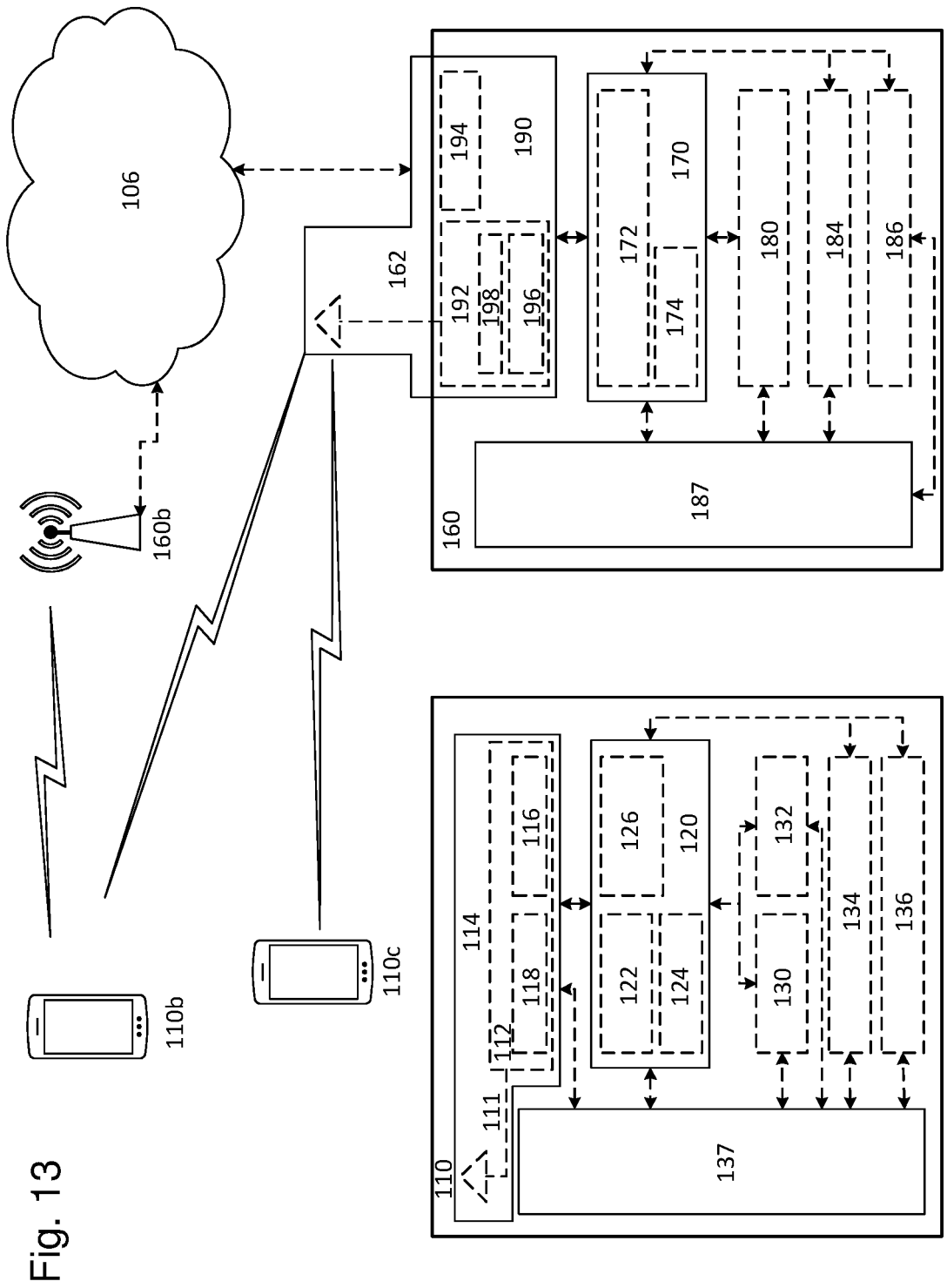
FIG. 13 is a block diagram illustrating an example wireless network.

FIG. 13 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 13 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 14:
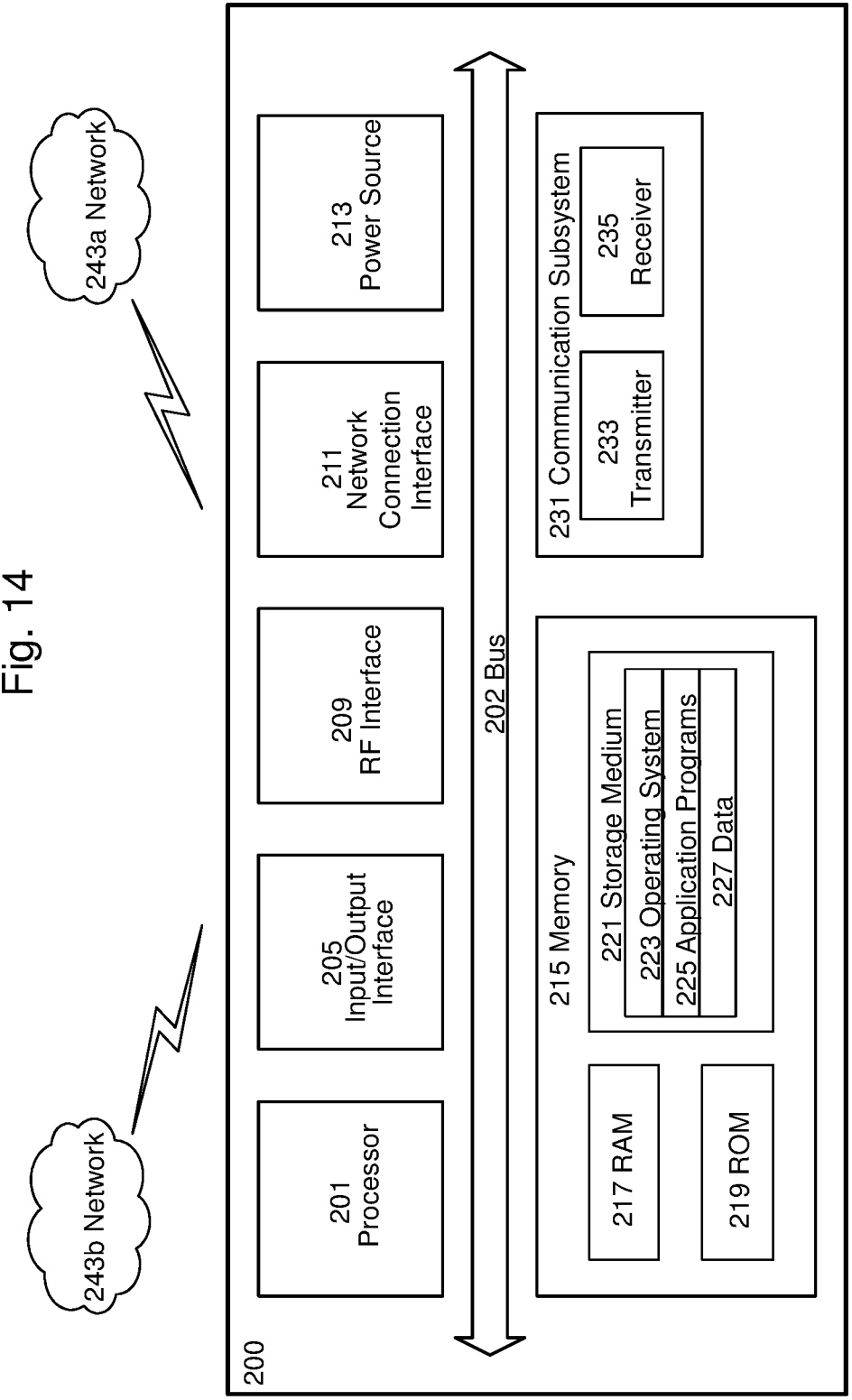
FIG. 14 illustrates an example user equipment, according to certain embodiments.

FIG. 14 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor. In FIG. 14, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 14, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 15:
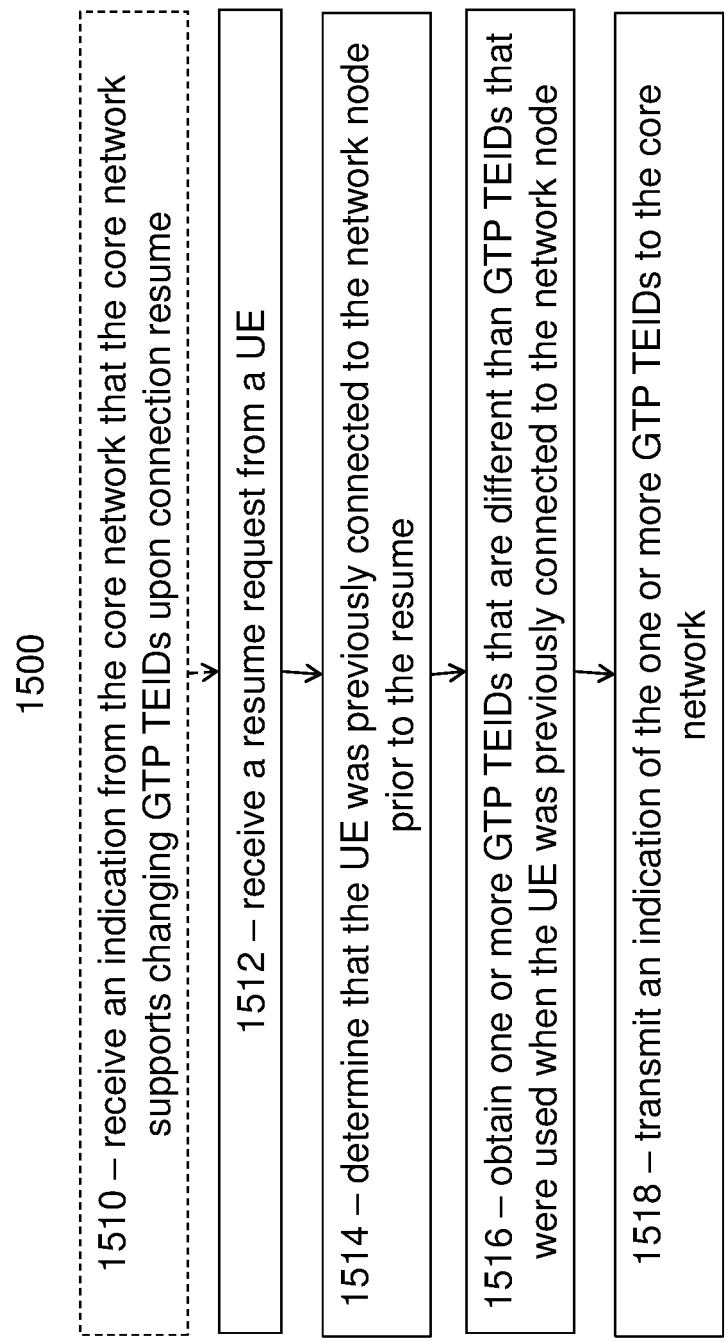
FIG. 15 is a flowchart illustrating an example method in a network node, according to certain embodiments.

FIG. 15 is a flowchart illustrating an example method in a network node, according to certain embodiments. In particular embodiments, one or more steps of FIG. 15 may be performed by network node 160 described with respect to FIG. 13.

The method may begin at step 1510 where a network node (e.g., network node 160) receives an indication from the core network that the core network supports changing GTP TEIDs upon connection resume. The network node may store this information and use it when receiving a resume request from a UE. If the network may benefit from using different GTP TEIDs on resume (e.g., move a bearer between SgNBs, from SgNB to MgNB, or vice versa), and if the core network supports that feature, then the network node may change one or more GTP TEIDs when a UE resumes a connection to the core network.

At step 1512, the network node receives a resume request from a UE (e.g., wireless device 110). The resume request may comprise an RRC Resume Request. In some embodiments the resume request may include a resume identifier.

At step 1514, the network node determines that the UE was previously connected to the network node prior to the resume. For example, upon connection suspension, the UE may have received a resume identifier and the network node may have saved the resume identifier (e.g., as part of the UE Context). Upon resume, the resume request may include the resume identifier and the network node may determine, based on the saved resume identifier, that the UE was previously connected to the network node. Other embodiments may include other methods of determining that the UE was previously connected to the network node.

At step 1516, the network node obtains one or more GTP TEIDs that are different than GTP TEIDs that were used when the UE was previously connected to the network node. For example, the network node may autonomously determine that it cannot use (or would rather not use) the same GTP TEIDs that it used prior to the resume. Some possible reasons for not using the same GTP TEIDs include the following: (a) the UE was in EN-DC prior to the suspend and the bearers (tunnels) under question were configured in SgNB prior to suspend, but at resume the (M)eNB may determine not to use a SgNB at all or use a different SgNB; (b) the bearers were configured in MeNB prior to suspend (or removed from the SgNB at suspend), but at resume the MeNB may determine to move the bearers to a SgNB to support a smooth transition to EN-DC; or (c) any other reason (e.g., resource load balancing) why the network node would rather not allocate the same GTP TEIDs to the UE when the UE resumes.

In particular embodiments, obtaining the one or more GTP TEIDs comprises receiving the one or more GTP TEIDs from another network node. For example, another network node may make the determination and send the new GTP TEIDs to the network node via an X1 interface (or any other suitable interface).

At step 1518, the network node transmits an indication of the one or more GTP TEIDs to the core network. In various embodiments, the network node may transmit the indication via different procedures.

For example, in some embodiments the network node transmits the indication of the one or more GTP TEIDs to the core network by initiating a path switch procedure (e.g., LTE or NR procedure) with the core network. The path switch procedure comprises transmitting path switch request message that includes the one or more GTP TEIDs.

In some embodiments, the processing circuitry is operable to transmit the indication of the one or more GTP TEIDs to the core network by initiating a UE context resume procedure (e.g., LTE or NR procedure) with the core network. The UE context resume procedure comprises transmitting a UE context resume message that includes the one or more GTP TEIDs.

In particular embodiments, the processing circuitry is operable to transmit the indication of the one or more GTP TEIDs to the core network by initiating a radio access bearer modification procedure (e.g., LTE or NR procedure) with the core network. The radio access bearer modification procedure comprises transmitting a radio access bearer modification message that includes the one or more GTP TEIDs. The radio access bearer modification message may further include an indication that a radio bearer associated with one of the one or more GTP TEIDs is to be resumed.

Modifications, additions, or omissions may be made to method 1500 of FIG. 15. Additionally, one or more steps in the method of FIG. 15 may be performed in parallel or in any suitable order.

Figure 16:
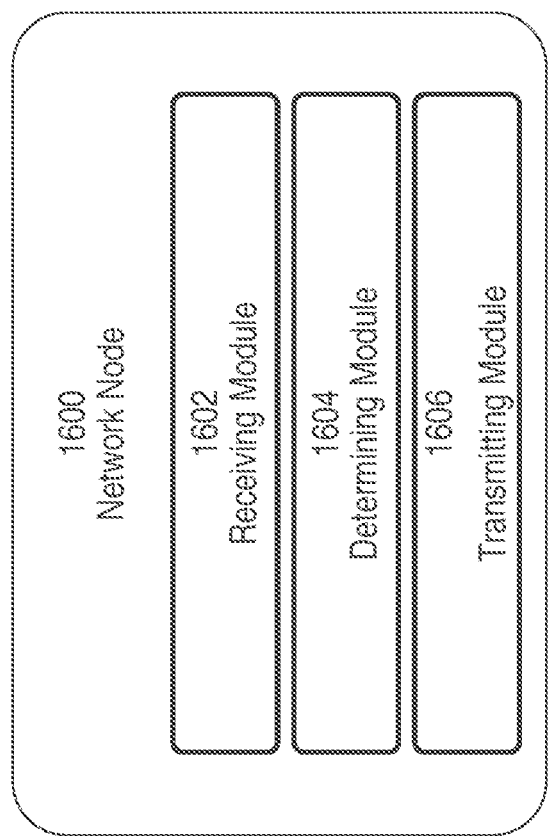
FIG. 16 illustrates an example wireless device, according to certain embodiments.

FIG. 16 illustrates an example network node, according to certain embodiments. The apparatus may be implemented in a network node (e.g., network node 160 illustrated in FIG. 1). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities, including virtual apparatuses.

Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1602, determining module 1604, transmitting module 1606, and any other suitable units of apparatus 1600 to perform corresponding functions according one or more embodiments of the present disclosure.

As illustrated in FIG. 16, apparatus 1600 includes receiving module 1602, determining module 1604, and transmitting module 1606. In certain embodiments, receiving module 1602 may receive configuration information from the core network and/or receive resume requests from a wireless device. Determining module 1604 may determine whether the wireless device was previously connected to the network node and determine whether any GTP TEIDs have changed according to any of the embodiments and examples described herein. In certain embodiments, transmitting nodule 1606 may transmit an indication of one or more changed GTP TEIDs to the core network according to any of the embodiments and examples described herein.

Figure 17:
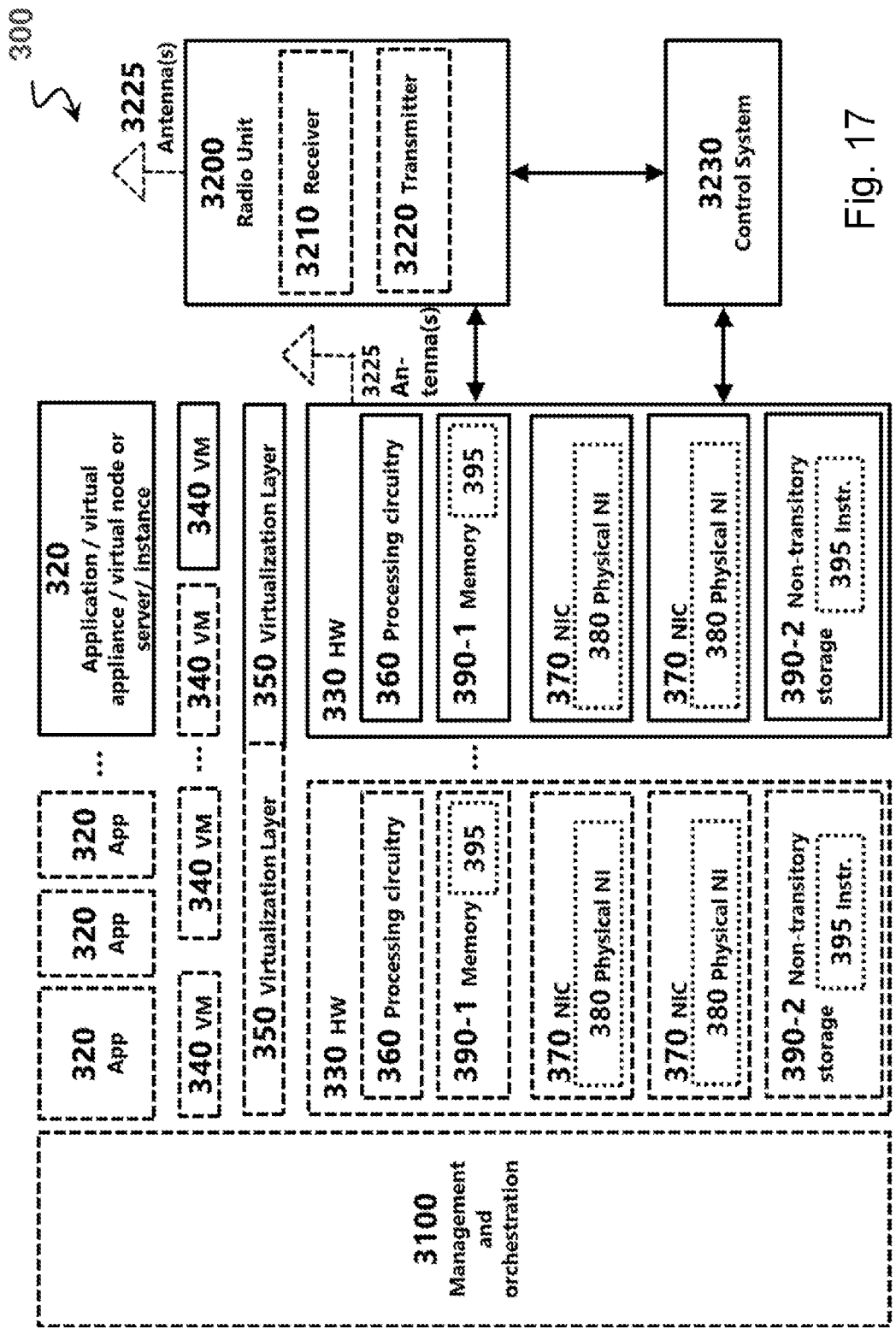
FIG. 17 illustrates an example virtualization environment, according to certain embodiments.

FIG. 17 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 17, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 17.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 18:
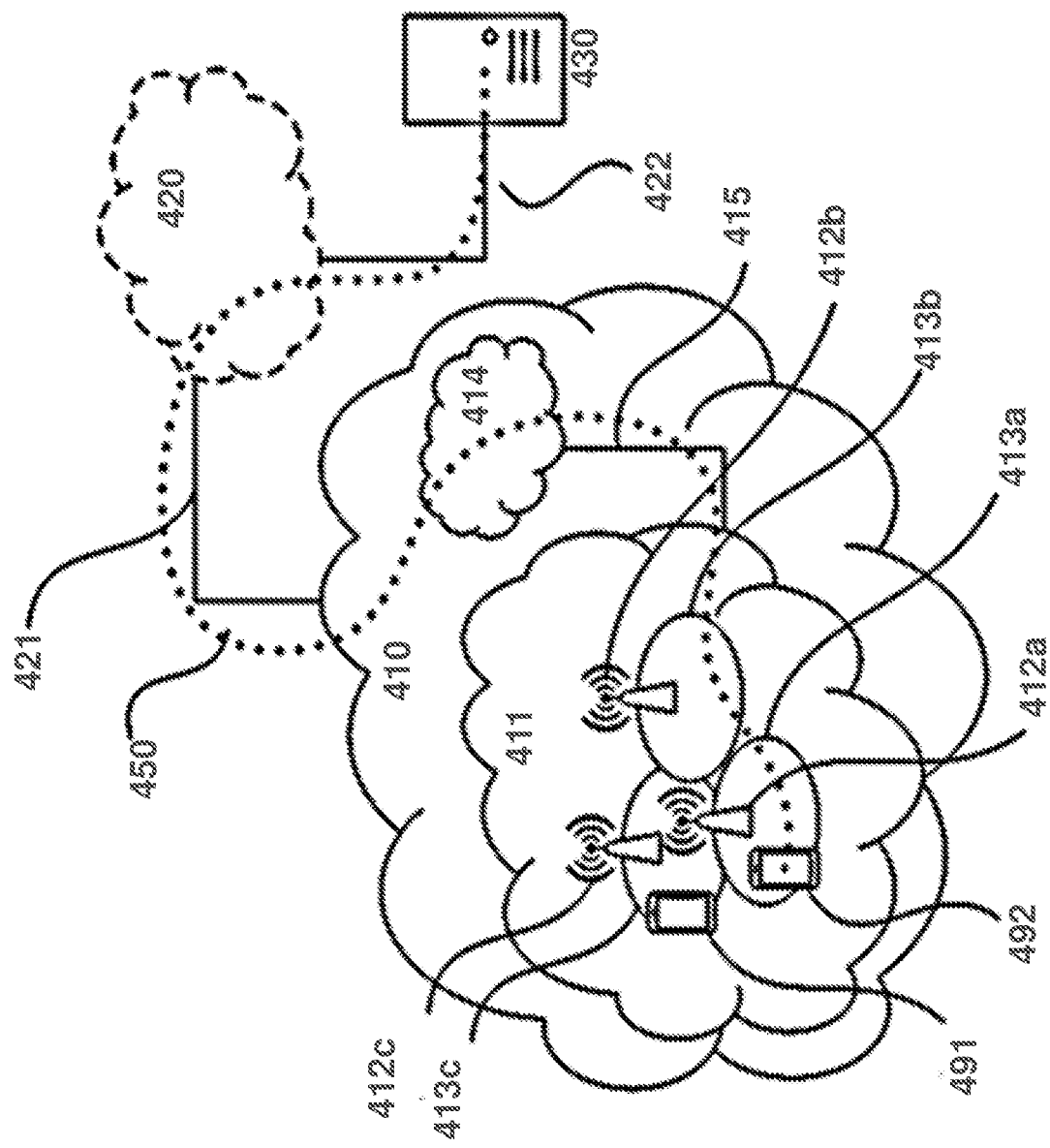
FIG. 18 illustrates an example telecommunication network connected via an intermediate network to a host computer, according to certain embodiments.

With reference to FIG. 18, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 18 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 19:
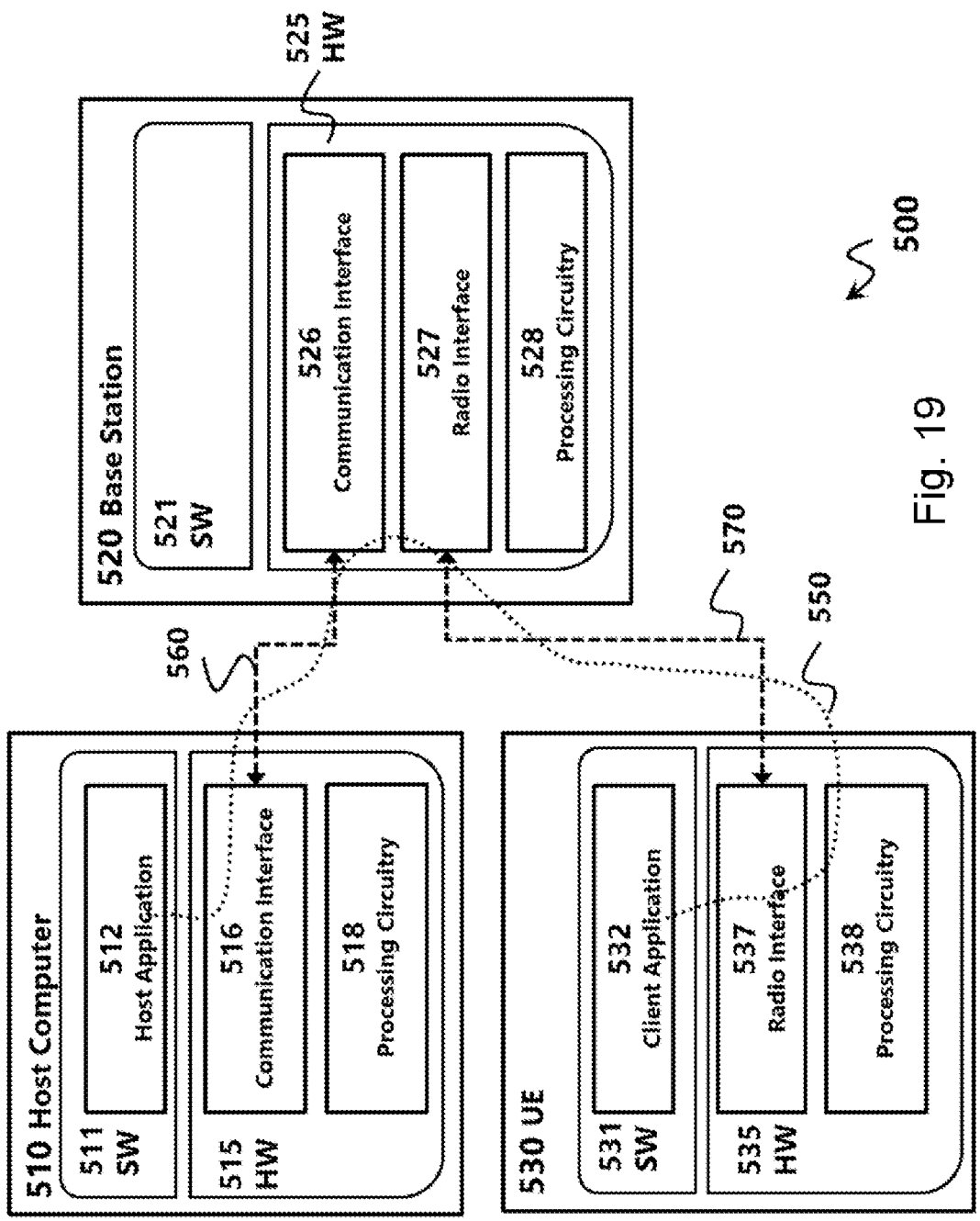
FIG. 19 illustrates an example host computer communicating via a base station with a user equipment over a partially wireless connection, according to certain embodiments.

FIG. 19 illustrates an example host computer communicating via a base station with a user equipment over a partially wireless connection, according to certain embodiments. Example implementations, in accordance with an embodiment, of the UE, base station and host computer discussed in the preceding paragraphs will now be described with reference to FIG. 19. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 19) served by base station 520. Communication interface 526 may be configured to facilitate connection 560 to host computer 510. Connection 560 may be direct, or it may pass through a core network (not shown in FIG. 19) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 19 may be similar or identical to host computer 430, one of base stations 412a, 412b, 412c and one of UEs 491, 492 of FIG. 18, respectively. This is to say, the inner workings of these entities may be as shown in FIG. 15 and independently, the surrounding network topology may be that of FIG. 18.

In FIG. 19, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 20:
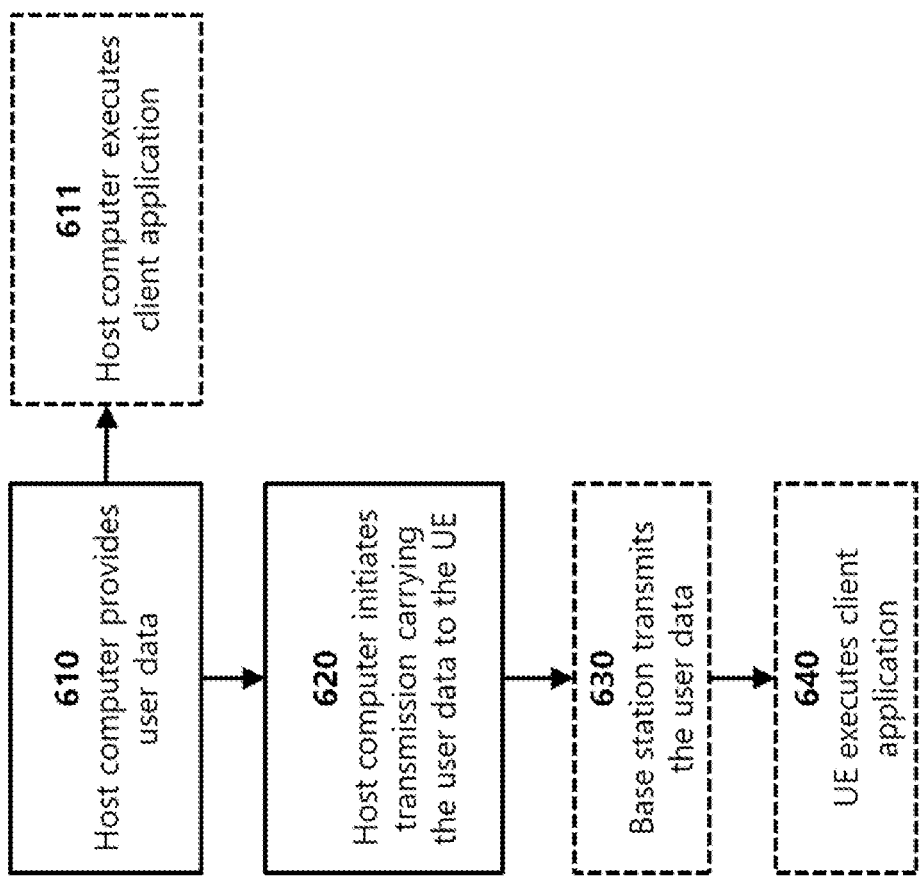
FIG. 20 is a flowchart illustrating a method implemented, according to certain embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 21:
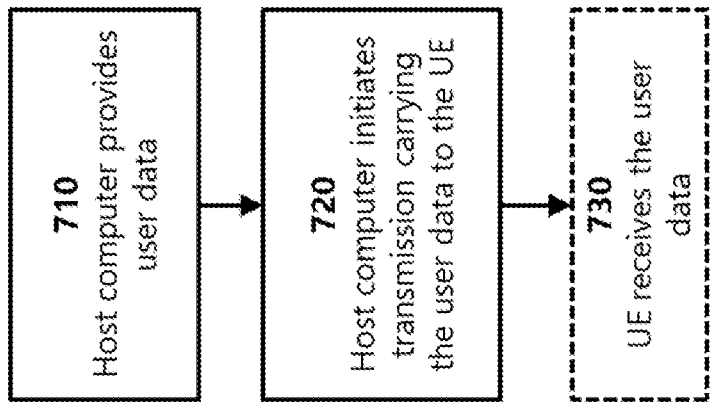
FIG. 21 is a flowchart illustrating a method implemented in a communication system, according to certain embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 22:
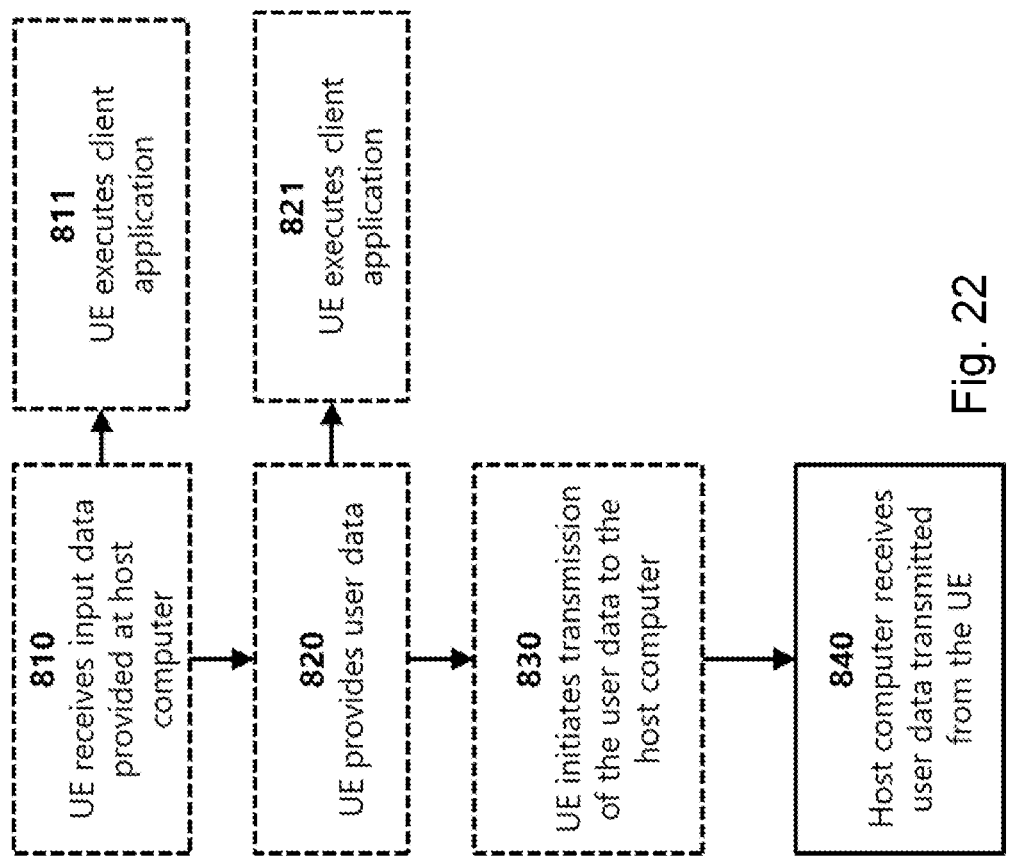
FIG. 22 is a flowchart illustrating another method implemented in a communication system, according to certain embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 23:
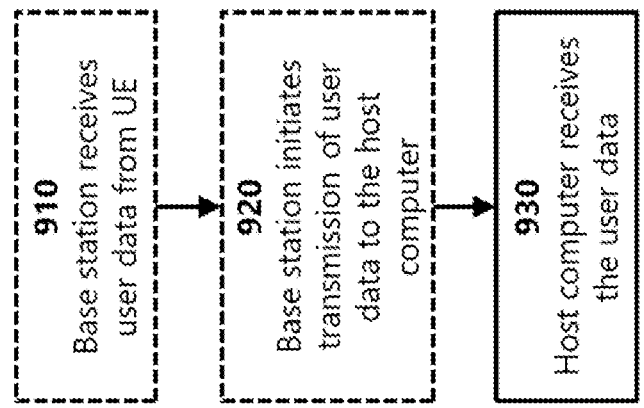
FIG. 23 is a flowchart illustrating another method implemented in a communication system, according to certain embodiments.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following examples provide a non-limiting example of how certain aspects of the proposed solutions could be implemented within the framework of a specific communication standard. In particular, these examples provide a non-limiting example of how the proposed solutions could be implemented within the framework of a 3GPP TSG RAN standard. The changes described by the examples are merely intended to illustrate how certain aspects of the proposed solutions could be implemented in a particular standard. However, the proposed solutions could also be implemented in other suitable manners, both in the 3GPP Specification and in other specifications or standards.

Example changes to 3GPP TS 36.413 Section 8.4.4 may include the following. The purpose of the Path Switch Request procedure is to request the switch of a downlink GTP tunnel towards a new GTP tunnel endpoint. It can also be used to trigger the UE to resume when the UE returns to the same MeNB and in addition the MeNB determines it will not be able to use the same GTP TEIDs as it had prior to the resume.

Figure 24:
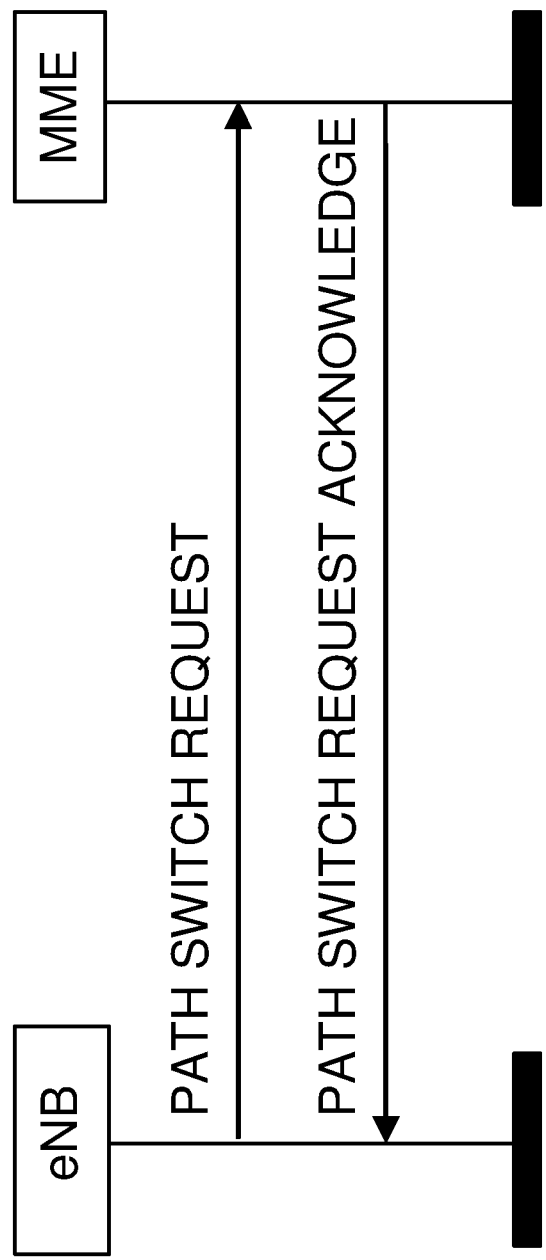
FIG. 24 is a flow diagram illustrating successful operation of a Path Switch Request.

FIG. 24 is a flow diagram illustrating successful operation of a Path Switch Request. The eNB initiates the procedure by sending the PATH SWITCH REQUEST message to the MME.

If the E-RAB to Be Switched in Downlink List IE in the PATH SWITCH REQUEST message does not include all E-RABs previously included in the UE Context, the MME shall consider the non-included E-RABs as implicitly released by the eNB.

When the eNB has received from the radio interface the RRC Resume Cause IE, it shall include it in the PATH SWITCH REQUEST message.

After all necessary updates including the UP path switch have been successfully completed in the EPC for at least one of the E-RABs included in the PATH SWITCH REQUEST E-RAB to Be Switched in Downlink List IE, the MME shall send the PATH SWITCH REQUEST ACKNOWLEDGE message to the eNB and the procedure ends. The UE-associated logical S1-connection shall be established at reception of the PATH SWITCH REQUEST ACKNOWLEDGE message.

In case the EPC failed to perform the UP path switch for at least one, but not all, of the E-RABs included in the PATH SWITCH REQUEST E-RAB to Be Switched in Downlink List IE, the MME shall include the E-RABs it failed to perform UP path switch in the PATH SWITCH REQUEST ACKNOWLEDGE E-RAB To Be Released List IE. In this case, the eNB shall release the corresponding data radio bearers, and the eNB shall regard the E-RABs indicated in the E-RAB To Be Released List IE as being fully released.

If the CSG Id IE and no Cell Access Mode IE are received in the PATH SWITCH REQUEST message, the MME shall use it in the core network as specified in TS 23.401. If the CSG Id IE and the Cell Access Mode IE set to "hybrid" are received in the PATH SWITCH REQUEST message, the MME shall decide the membership status of the UE and use it in the core network as specified in TS 23.401. If no CSG Id IE and no Cell Access Mode IE are received in the PATH SWITCH REQUEST message and the UE was previously either in a CSG cell or in a hybrid cell, the MME shall consider that the UE has moved into a cell that is neither a CSG cell nor a hybrid cell and use this as specified in TS 23.401.

If the GUMMEI of the MME currently serving the UE is available at the eNB (see TS 36.300) the eNB shall include the Source MME GUMMEI IE within the PATH SWITCH REQUEST message.

Upon reception of the PATH SWITCH REQUEST ACKNOWLEDGE message the eNB shall store the received Security Context IE in the UE context and the eNB shall use it for the next X2 handover or Intra eNB handovers as specified in TS 33.401.

The PATH SWITCH REQUEST ACKNOWLEDGE message may contain: (a) the UE Aggregate Maximum Bit Rate IE; and (b) the MME UE S1AP ID 2 IE, which indicates the MME UE S1AP ID assigned by the MME.

If the UE Aggregate Maximum Bit Rate IE is included in the PATH SWITCH REQUEST ACKNOWLEDGE message the eNB shall replace the previously provided UE Aggregate Maximum Bit Rate by the received UE Aggregate Maximum Bit Rate in the UE context; the eNB shall use the received UE Aggregate Maximum Bit Rate for non-GBR Bearers for the concerned UE.

If the UE Aggregate Maximum Bit Rate IE is not contained in the PATH SWITCH REQUEST ACKNOWLEDGE message, the eNB shall use the previously provided UE Aggregate Maximum Bit Rate which is stored in the UE context.

In case the EPC decides to change the uplink termination point of the tunnels, it may include the E-RAB To Be Switched in Uplink List IE in the PATH SWITCH REQUEST ACKNOWLEDGE message to specify a new uplink transport layer address and uplink GTP-TEID for each respective E-RAB for which it wants to change the uplink tunnel termination point.

When the eNB receives the PATH SWITCH REQUEST ACKNOWLEDGE message and if this message includes the E-RAB To Be Switched in Uplink List IE, the eNB shall start delivering the uplink packets of the concerned E-RABs to the new uplink tunnel endpoints as indicated in the message.

When the eNB receives the PATH SWITCH REQUEST ACKNOWLEDGE message including the CSG Membership Status IE, and if the cell that serves the UE is a hybrid cell, the eNB shall use it as defined in TS 36.300.

If the MME UE S1AP ID 2 IE is contained in the PATH SWITCH REQUEST ACKNOWLEDGE message, the eNB shall store this information in the UE context and use it for subsequent X2 handovers.

If the Tunnel Information for BBF IE is received in the PATH SWITCH REQUEST message, the MME shall, if supported, use it in the core network as specified in TS 23.139.

If the LHN ID IE is included in the PATH SWITCH REQUEST message, the MME shall, if supported, use it as specified in TS 23.401.

If the ProSe Authorized IE is contained in the PATH SWITCH REQUEST ACKNOWLEDGE message, the eNB shall, if supported, update its ProSe authorization information for the UE accordingly. If the ProSe Authorized IE includes one or more IEs set to "not authorized", the eNB shall, if supported, initiate actions to ensure that the UE is no longer accessing the relevant ProSe service(s).

If the UE User Plane CIoT Support Indicator IE is included in the PATH SWITCH REQUEST ACKNOWLEDGE message and is set to "supported", the eNB shall, if supported, consider that User Plane CIoT EPS Optimisation as specified in TS 23.401 is supported for the UE.

If the V2X Services Authorized IE is contained in the PATH SWITCH REQUEST ACKNOWLEDGE message, the eNB shall, if supported, update its V2X services authorization information for the UE accordingly. If the V2X Services Authorized IE includes one or more IEs set to "not authorized", the eNB shall, if supported, initiate actions to ensure that the UE is no longer accessing the relevant service(s).

If the UE Sidelink Aggregate Maximum Bit Rate IE is included in the PATH SWITCH REQUEST ACKNOWLEDGE message, the eNB shall, if supported: (a) replace the previously provided UE Sidelink Aggregate Maximum Bit Rate, if available in the UE context, with the received value; and (b) use the received value for the concerned UE's sidelink communication in network scheduled mode for V2X services.

If the Enhanced Coverage Restricted IE is included in the PATH SWITCH REQUEST ACKNOWLEDGE message, the eNB shall store this information in the UE context and use it as defined in TS 23.401.

If information on the UE's NR security capabilities is available at the eNB (see TS 33.401) the eNB shall include the NR UE Security Capabilities IE within the PATH SWITCH REQUEST message.

If the NR UE Security Capabilities IE is included in the PATH SWITCH REQUEST message, the MME shall, if supported, consider that the eNB has stored the respective information in the UE context, and proceed as defined in TS 33.401.

If the NR UE Security Capabilities IE is included in the PATH SWITCH REQUEST ACKNOWLEDGE message, the eNB shall, if supported, store this information in the UE context and use it as defined in TS 33.401.

Example changes to 3GPP TS 36.413 Section 8.3.8 may include the following. The purpose of the UE Context Resume procedure is to indicate to the MME that the UE has resumed the suspended RRC connection and to request the MME to resume the UE context, UE-associated logical S1-connection and the related bearer contexts in the EPC.

Figure 25:
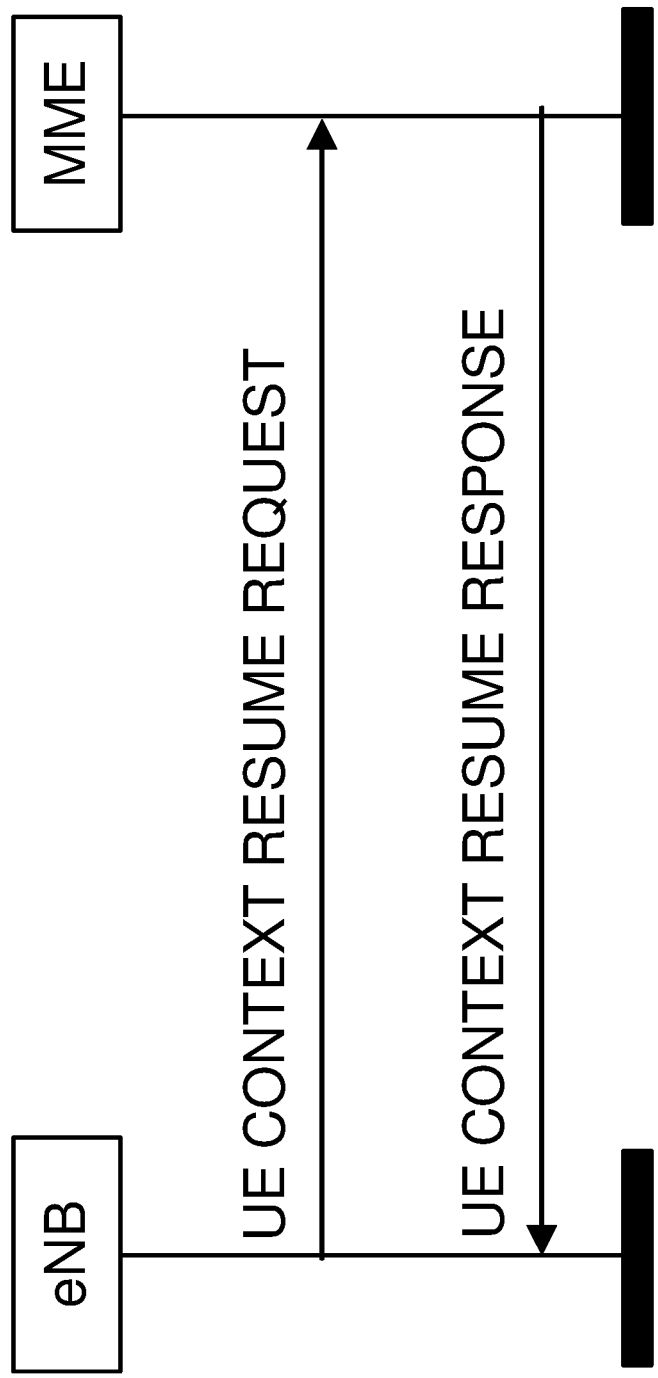
FIG. 25 is a flow diagram illustrating successful operation of a UE Context Resume procedure.

FIG. 25 is a flow diagram illustrating successful operation of a UE Context Resume procedure. The eNB initiates the procedure by sending the UE CONTEXT RESUME REQUEST message to the MME. If the eNB is not able to admit all suspended E-RABs the eNB shall indicate this in the E-RABs Failed To Resume List IE.

Upon receipt of the UE CONTEXT RESUME REQUEST message the MME shall act as defined in TS 23.401 and respond with the UE CONTEXT RESUME RESPONSE. If the MME is not able to admit all suspended E-RABs the MME shall indicate this in the E-RABs Failed To Resume List IE.

The eNB shall release resources for each E-RAB failed to resume and shall assume that the EPC has released respective resources as well.

If the Security Context IE is included in the UE CONTEXT RESUME RESPONSE message, the eNB shall store the received Security Context IE in the UE context and the eNB shall use it for the next suspend/resume or X2 handover or Intra eNB handovers as specified in TS 33.401.

If GTP TEIDs are included in the UE CONTEXT RESUME REQUEST message, the MeNB will change the GTP TEIDs of the specified E-RABs.

Figure 26:
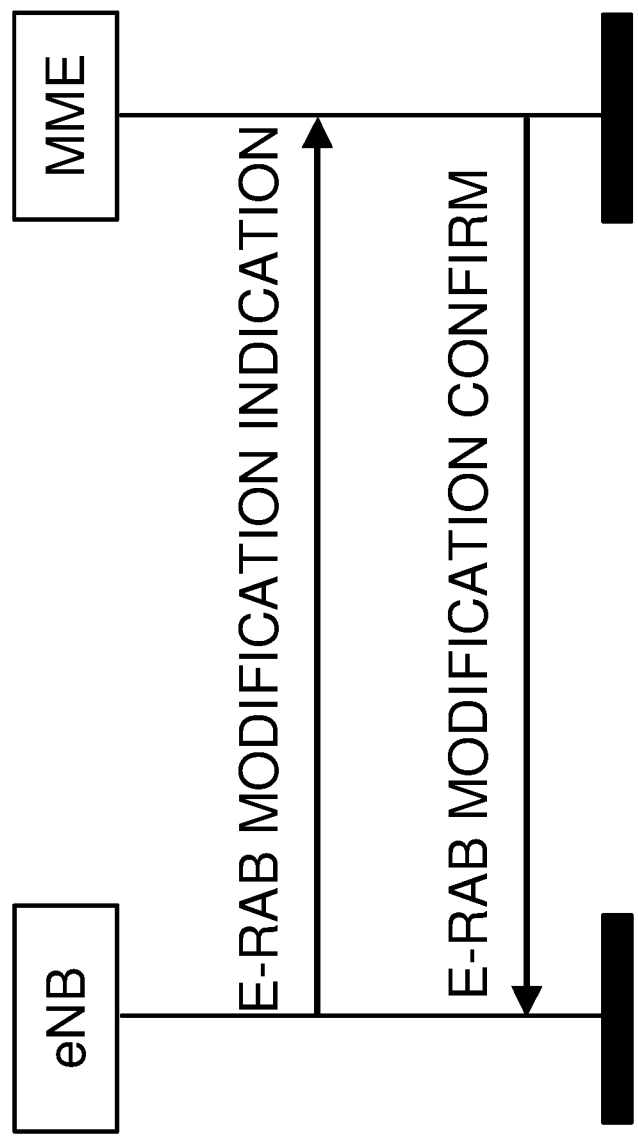
FIG. 26 is a flow diagram illustrating successful operation of a E-RAB Modification Indication procedure.

The message in Table 2 is sent by the eNB to request the MME to indicate that the suspended RRC connection has been resumed FIG. 26 is a flow diagram illustrating successful operation of a E-RAB Modification Indication procedure. The eNB initiates the procedure by sending an E-RAB MODIFICATION INDICATION message to the MME.

The Transport Layer Address IE and DL GTP TEID IE included in the E-RAB To Be Modified Item IEs IE in the E-RAB MODIFICATION INDICATION message shall be considered by the MME as the new DL address of the E-RABs. The Transport Layer Address IE and DL GTP TEID IE included in the E-RAB Not To Be Modified Item IEs IE in the E-RAB MODIFICATION INDICATION message shall be considered by the MME as the E-RABs with unchanged DL address.

If the Secondary RAT Usage Report List IE is included in the E-RAB MODIFICATION INDICATION message, the MME shall handle this information as specified in TS 23.401.

The E-RAB MODIFICATION CONFIRM message shall contain the result for all the E-RABs that were requested to be modified according to the E-RAB To Be Modified Item IEs IE of the E-RAB MODIFICATION INDICATION message as follows: (a) a list of E-RABs which are successfully modified shall be included in the E-RAB Modify List IE; (b) a list of E-RABs which failed to be modified, if any, shall be included in the E-RAB Failed to Modify List IE; and (c) a

TABLE 2

UE Context Resume Request

| IE/Group Name | Presence | Range | IE type and reference | Semantics description | Criticality | Assigned Criticality |
| --- | --- | --- | --- | --- | --- | --- |
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| E-RAB Failed To Resume List | | 0..1 | | | YES | reject |
| >E-RAB Failed To Resume Item IEs | | 1 .. <maxnoofE-RABs> | | | EACH | reject |
| >>E-RAB ID | M | | 9.2.1.2 | | — | |
| >>Cause | M | | 9.2.1.3 | | — | |
| RRC Resume Cause | O | | RRC Establishment Cause 9.2.1.3a | | YES | ignore |
| E-RAB To Be Switched in Downlink List | | 1 | | | YES | reject |
| >E-RABs Switched in Downlink Item IEs | | 1 .. <maxnoofE-RABs> | | | EACH | reject |
| >>E-RAB ID | M | | 9.2.1.2 | | — | |
| >>Transport Layer address | M | | 9.2.2.1 | | — | |
| >>GTP-TEID | M | | 9.2.2.2 | To deliver DL PDUs. | — | |

| Range bound | Explanation |
| --- | --- |
| maxnoofE-RABs | Maximum no. of E-RAB allowed towards one UE, the maximum value is 256. |

Example changes to 3GPP TS 36.413 Section 8.2.4 may include the following. The purpose of the E-RAB Modification Indication procedure is to enable the eNB to request modifications of already established E-RABs for a given UE. It can also be used to resume a suspended connection. The MME will resume the S1 connection when it receives this message. The procedure uses UE-associated signalling.

list of E-RABs which are to be released, if any, shall be included in the E-RAB To Be Released List IE.

If the E-RAB Failed to Modify List IE is received in the E-RAB MODIFICATION CONFIRM message, the eNB shall either (a) release all corresponding E-UTRA and E-UTRAN resources for the concerned E-RAB or (b) keep the previous transport information before sending the E-RAB MODIFICATION INDICATION message unchanged for the concerned E-RAB.

If the E-RAB To Be Released List IE is received in the E-RAB MODIFICATION CONFIRM message, the eNB shall release all corresponding E-UTRA and E-UTRAN resources for the concerned E-RAB.

If the CSG Membership Info IE is included in the E-RAB MODIFICATION INDICATION message, the MME shall use the information for CSG membership verification as specified in TS 36.300 and provide the result of the membership verification in the CSG Membership Status IE contained in the E-RAB MODIFICATION CONFIRM message.

If PLMN Identity IE is received in the CSG Membership Info IE in the E-RAB MODIFICATION INDICATION message, the MME shall use it for CSG membership verification as specified in TS 36.300.

When the MME reports unsuccessful modification of an E-RAB, the cause value should be precise enough to enable the eNB to know the reason for an unsuccessful modification.

If the Tunnel Information for BBF IE is received in the E-RAB MODIFICATION INDICATION message, the MME shall, if supported, use it in the core network as specified in TS 23.139.

If the flag UE resume is on, then the GTP TEIDs of the indicated E-RABs will be changed accordingly.

The message in Table 3 is sent by the eNB and is used to request the MME to apply the indicated modification for one or several E-RABs.

TABLE 3

E-RAB Modification Indication

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| E-RAB to be Modified List | | 1 | | | YES | reject |
| >E-RAB to Be Modified Item IEs | | 1 .. <maxnoofE-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |
| E-RAB not to be Modified List | | 0..1 | | | YES | reject |
| >E-RAB not to Be Modified Item IEs | | 1 .. <maxnoofE-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |
| CSG Membership Info | | 0..1 | | | YES | reject |
| >CSG Membership Status | M | | 9.2.1.73 | | — | |
| >CSG Id | M | | 9.2.1.62 | | — | |
| >Cell Access Mode | O | | 9.2.1.74 | | — | |
| >PLMN Identity | O | | 9.2.3.8 | | — | |
| Tunnel Information for BBF | O | | Tunnel Information 9.2.2.3 | Indicating HeNB's Local IP Address assigned by the broadband access provider, UDP port Number. | YES | Ignore |
| Secondary RAT Usage Report List | O | | 9.2.1.x | | Yes | ignore |
| Flag UE resume | O | | | | | |

| Range bound | Explanation |
|---|---|
| maxnoofE-RABs | Maximum no. of E-RAB allowed towards one UE, the maximum value is 256. |

Upon resumption of a UE context in an eNB different from the one where the UE context was suspended or if the resumption is in the same eNB but the DL GTP TEIDs needs to be changed, the Path Switch procedure is used to request the MME to resume the UE context and related bearer contexts in the EPC and update the downlink path.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| 1x RTT | CDMA2000 1x Radio Transmission Technology |
| 3GPP | 3rd Generation Partnership Project |
| 5G | 5th Generation |
| 5GC | 5G Core |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| BLER | Block Error Rate |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix or Control Plane |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DC | Dual Connectivity |
| DCCH | Dedicated Control Channel |
| DCI | Downlink Control Information |
| DFTS OFDM | Discrete Fourier Transform Spread OFDM |
| DL | Downlink |
| DM | Demodulation |
| DMRS | Demodulation Reference Signal |
| DRB | Data Radio Bearer |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| EPC | Evolved Packet Core |
| ePDCCH | enhanced Physical Downlink Control Channel |
| EPS | Evolved Packet System |
| E-SMLC | evolved Serving Mobile Location Center |
| E-UTRA | Evolved UTRA |
| E-UTRAN | Evolved UTRAN |
| FDD | Frequency Division Duplex |
| GERAN | GSM EDGE Radio Access Network |
| gNB | Base station in NR |
| GNSS | Global Navigation Satellite System |
| GPRS | General Packet Radio Service |
| GSM | Global System for Mobile communication |
| GTP | GPRS Tunneling Protocol |
| HARQ | Hybrid Automatic Repeat Request |
| HO | Handover |
| HSPA | High Speed Packet Access |
| HRPD | High Rate Packet Data |
| IR-HARQ | Incremental Redundancy HARQ |
| L1 | Layer 1 |
| LLR | Log Likelihood Ratio |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MCS | Modulation and Coding Scheme |
| MDT | Minimization of Drive Tests |
| MIB | Master Information Block |
| MIMO | Multiple Input Multiple Output |
| MME | Mobility Management Entity |
| MN | Master Node |
| MR-DC | Multiple RAT Dual Connectivity |
| MSC | Mobile Switching Center |
| NG | Next Generation |
| NPDCCH | Narrowband Physical Downlink Control Channel |
| NR | New Radio |
| OCNG OFDMA | Channel Noise Generator |

| Abbreviation | Explanation |
| --- | --- |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PA | Power Amplifier |
| PBCH | Physical Broadcast Channel |
| P-CCPCH | Primary Common Control Physical Channel |
| PCell | Primary Cell |
| PCFICH | Physical Control Format Indicator Channel |
| PCRF | Policy and Charging Rules Function |
| PDCCH | Physical Downlink Control Channel |
| PDCP | Packet Data Convergence Protocol |
| PDN | Packet Data Network |
| PDP | Profile Delay Profile |
| PDSCH | Physical Downlink Shared Channel |
| PDU | Protocol Data Unit |
| PGW | Packet Gateway |
| PHICH | Physical Hybrid-ARQ Indicator Channel |
| PHY | Physical Layer |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RF | Radio Frequency |
| RLC | Radio Link Control |
| RLM | Radio Link Management |
| RNC | Radio Network Controller |
| RNL | Radio Network Layer |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SC | Successive Cancellation |
| SCL | Successive Cancellation List |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SN | Secondary Node |
| SNR | Signal to Noise Ratio |
| SON | Self Optimized Network |
| SPS | Semi-Persistent Scheduling |
| SRB | Signaling Radio Bearer |
| SRI | SRS Resource Indicator |
| SRS | Sounding Reference Signal |
| SS | Synchronization Signal |
| SSB | Synchronization Signal Block |
| SSS | Secondary Synchronization Signal |
| TDD | Time Division Duplex |
| TDOA | Time Difference of Arrival |
| TEID | Tunneling Endpoint Identifier |
| TFRE | Time Frequency Resource Element |
| TNL | Transport Network Layer |
| TOA | Time of Arrival |
| TPMI | Transmit Precoder Matrix Indicator |
| TRI | Transmission Rank Indicator |
| TSS | Tertiary Synchronization Signal |
| TTI | Transmission Time Interval |
| UCI | Uplink Control Information |
| UE | User Equipment |
| UL | Uplink |
| UMTS | Universal Mobile Telecommunication System |
| UP | User Plane |
| URLLC | Ultra Reliable Low Latency Communication |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| V2X | Vehicle to everything |
| VoIP | Voice over Internet Protocol |
| WCDMA | Wide CDMA |
| WLAN | Wide Local Area Network |

The invention claimed is:

1. A method for use in a network node for changing a general packet radio service (GPRS) tunneling protocol (GTP) tunneling endpoint identifier (TEID) when a user equipment (UE) resumes a connection to a core network, the method comprising:
receiving a resume request from a UE;
determining that the UE was previously connected to the network node prior to the resume;
acquiring one or more first GTD TEIDs that were used when the UE was previously connected to the network node;
changing the one or more first GTD TEIDs to obtain one or more second GTP TEIDs that are different from the one or more first GTP TEIDs; and
transmitting an indication of the one or more second GTP TEIDs to the core network,
wherein the indication of the one or more second GTP TEIDs indicates initiating a radio access bearer modification procedure with the core network, the radio access bearer modification procedure comprising transmitting a radio access bearer modification message that includes the one or more second GTP TEIDs.

2. The method of claim 1, wherein the indication of the one or more second GTP TEIDs further indicates initiating a path switch procedure with the core network, the path switch procedure comprising transmitting path switch request message that includes the one or more second GTP TEIDs.

3. The method of claim 2, wherein the path switch procedure comprises a long term evolutions (LTE) S1 Path Switch procedure or a new radio (NR) NG Path Switch procedure.

4. The method of claim 1, wherein transmitting the indication of the one or more second GTP TEIDs further indicates initiating a UE context resume procedure with the core network, the UE context resume procedure comprising transmitting a UE context resume message that includes the one or more second GTP TEIDs.

5. The method of claim 4, wherein the UE context resume procedure comprises a long term evolutions (LTE) S1 UE Context Resume procedure or a new radio (NR) NG UE Context Resume procedure.

6. The method of claim 1, the radio access bearer modification procedure comprises a long term evolutions (LTE) S1 radio access bearer modification procedure or a new radio (NR) radio access bearer modification procedure.

7. The method of claim 1, wherein the radio access bearer modification message further includes an indication that a radio bearer associated with one of the one or more second GTP TEIDs is to be resumed.

8. The method of claim 1, wherein the resume request includes an identifier, and determining that the UE was previously connected to the network node prior to the resume is based on the identifier in the resume request.

9. The method of claim 1, wherein changing the one or more first GTP TEIDs to obtain the one or more second GTP TEIDs comprises receiving the one or more second GTP TEIDs from another network node.

10. The method of claim 1, further comprising receiving an indication from the core network that the core network supports changing the one or more first GTP TEIDs upon connection resume.

11. A network node operable to change a general packet radio service (GPRS) tunneling protocol (GTP) tunneling endpoint identifier (TEID) when a user equipment (UE) resumes a connection to a core network, the network node comprising processing circuitry operable to:
  receive a resume request from a UE;
  determine that the UE was previously connected to the network node prior to the resume;
  acquire one or more first GTD TEIDs that were used when the UE was previously connected to the network node;
  change the one or more first GTD TEIDs to obtain one or more GTP TEIDs that are different than GTP TEIDs; and
  transmit an indication of the one or more GTP TEIDs to the core network,
wherein the indication of the one or more GTP TEIDs indicates initiating a radio access bearer modification procedure with the core network, the radio access bearer modification procedure comprising transmitting a radio access bearer modification message that includes the one or more second GTP TEIDs.

12. The network node of claim 11, wherein the indication of the one or more second GTP TEIDs further indicates initiating a path switch procedure with the core network, the path switch procedure comprising transmitting path switch request message that includes the one or more second GTP TEIDs.

13. The network node of claim 12, wherein the path switch procedure comprises a long term evolutions (LTE) S1 Path Switch procedure or a new radio (NR) NG Path Switch procedure.

14. The network node of claim 11, wherein the indication of the one or more second GTP TEIDs indicates initiating a UE context resume procedure with the core network, the UE context resume procedure comprising transmitting a UE context resume message that includes the one or more second GTP TEIDs.

15. The network node of claim 14, wherein the UE context resume procedure comprises a long term evolutions (LTE) S1 UE Context Resume procedure or a new radio (NR) NG UE Context Resume procedure.

* * * * *